United States Patent [19]
Nishino et al.

[11] Patent Number: 5,652,487
[45] Date of Patent: Jul. 29, 1997

[54] ELECTRIC POWER STEERING CONTROLLER WITH FAILURE DETECTING FUNCTION

[75] Inventors: Kazuhisa Nishino; Yuji Takatsuka; Shunichi Wada, all of Himeji, Japan

[73] Assignee: Mitsubishi Denki Kabushiki Kaisha, Tokyo, Japan

[21] Appl. No.: 514,135

[22] Filed: Aug. 11, 1995

[30] Foreign Application Priority Data

Aug. 12, 1994 [JP] Japan .................................. 6-190677

[51] Int. Cl.[6] .................................................. H02K 17/32
[52] U.S. Cl. ........................ 318/434; 318/432; 318/489; 180/446
[58] Field of Search ...................... 318/432, 434, 318/429; 180/79.1, 133, 142, 443–446; 364/424.01, 425; 74/388 PS

[56] References Cited

U.S. PATENT DOCUMENTS

| | | | |
|---|---|---|---|
| 4,573,545 | 3/1986 | Kains ................................ | 180/79.1 |
| 4,621,327 | 11/1986 | Dolph et al. ......................... | 180/79.1 |
| 4,736,810 | 4/1988 | Morishita et al. .................... | 180/79.1 |
| 4,754,830 | 7/1988 | Morishita et al. .................... | 180/79.1 |
| 4,842,087 | 6/1989 | Morishita et al. .................... | 180/79.1 |
| 4,896,735 | 1/1990 | Morishita et al. .................... | 180/79.1 |

*Primary Examiner*—David S. Martin
*Attorney, Agent, or Firm*—Sughrue, Mion, Zinn, Macpeak & Seas

[57] ABSTRACT

In a electric power steering controller, an output signal of motor driving direction discrimination means is compared with a driving direction discrimination processing result to detect a failure of the motor driving direction discriminator in accordance with the comparison result, so as to prevent the runaway of a motor supplying steering force to a steering wheel.

The following are included: a motor for supplying a steering force to a steering wheel, a steering torque detector for detecting the steering force from the steering wheel, a motor control for drive-controlling the motor rightward or leftward in accordance with the output of the steering torque detector, a motor driving direction discrimination means for outputting a motor right- or left-direction discriminating signal in accordance with the value of the output of the steering torque discriminator, and a microcomputer 8 for determining the vicinity of a neutral point of steering torque and judging whether the motor driving direction discriminator or has failed in accordance with a judgment result of a signal output from the motor driving direction discriminator when the vicinity of the neutral point is discriminated.

26 Claims, 28 Drawing Sheets

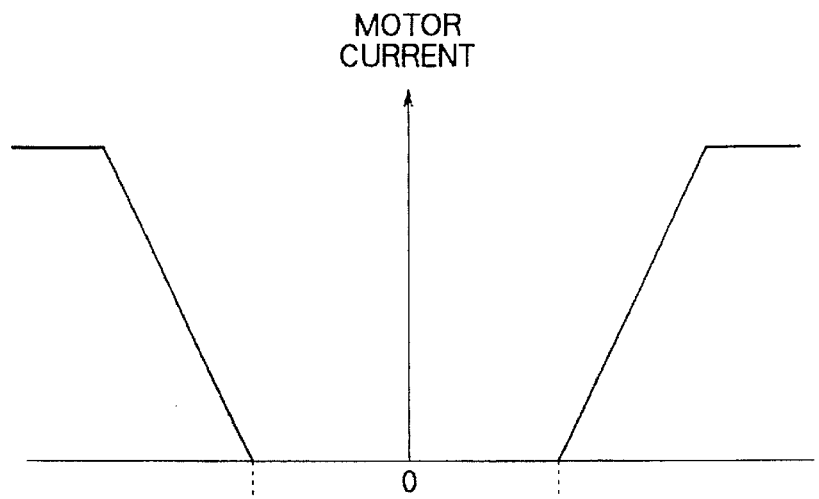

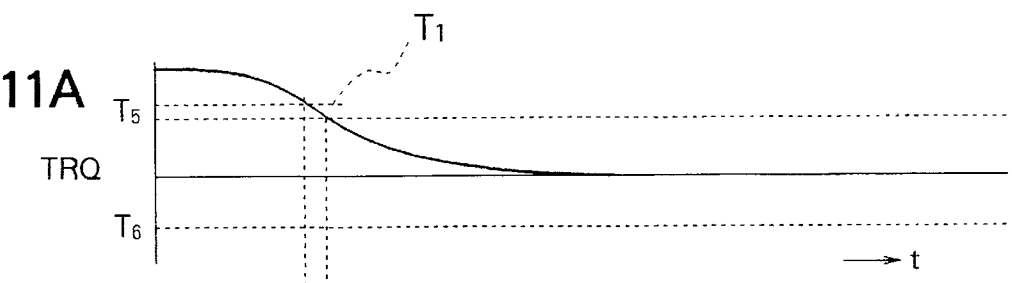
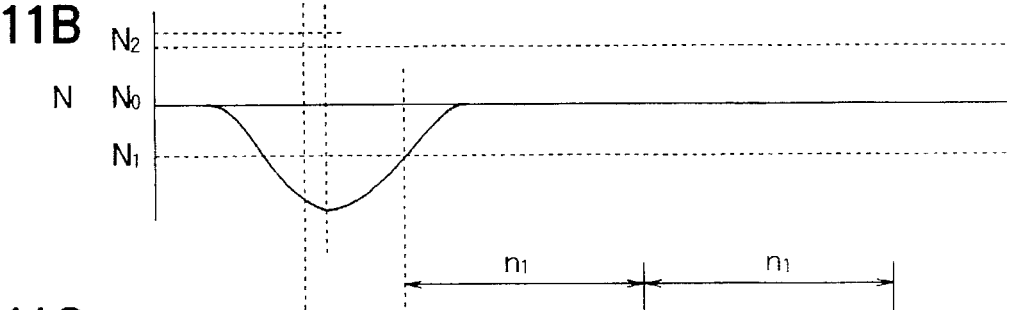
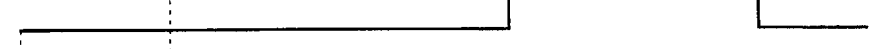
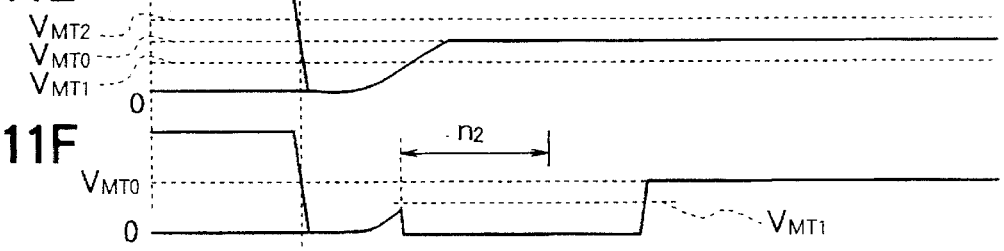
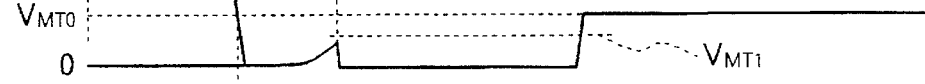
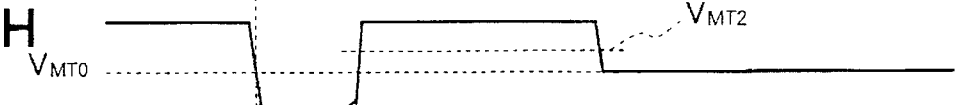
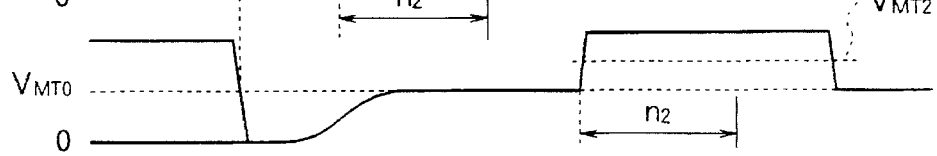

FIG. 15A
FIG. 15B
FIG. 15C
FIG. 15D
FIG. 15E
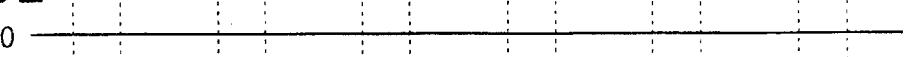
FIG. 15F
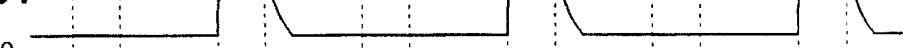
FIG. 15G
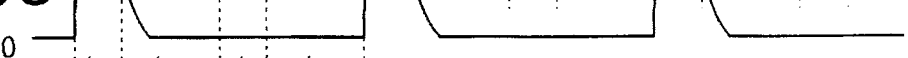

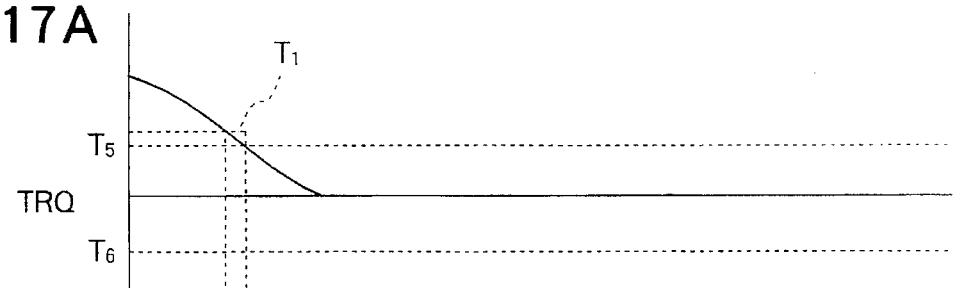
FIG. 17A
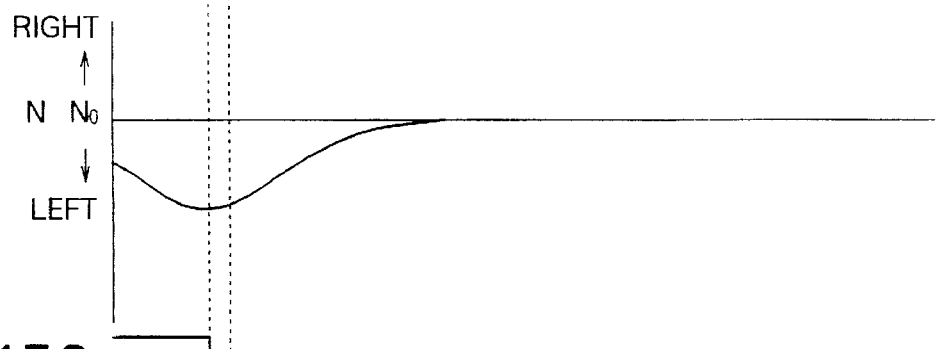
FIG. 17B
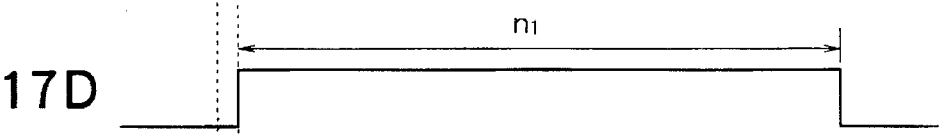
FIG. 17C
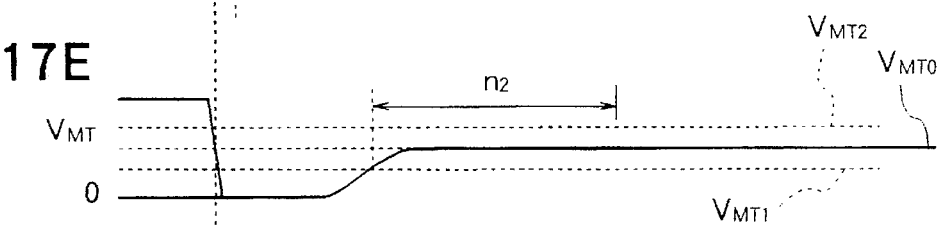
FIG. 17D
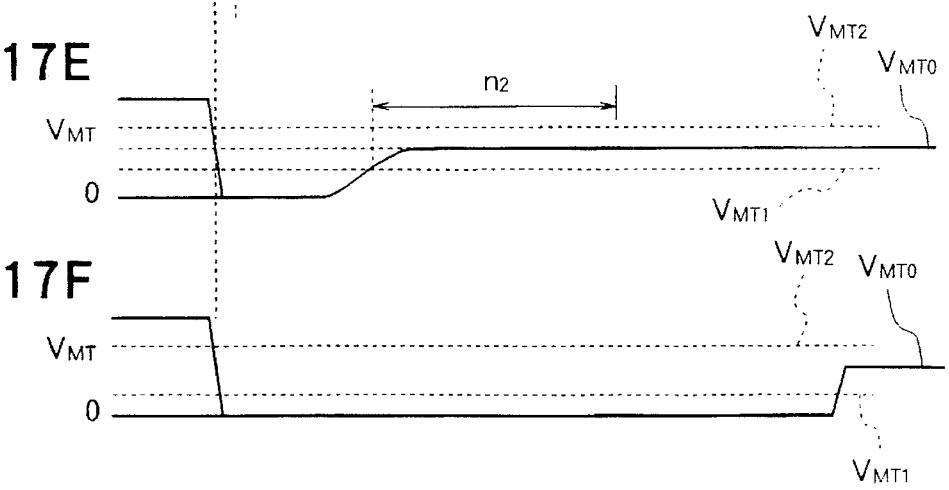
FIG. 17E
FIG. 17F

ELECTRIC POWER STEERING CONTROLLER WITH FAILURE DETECTING FUNCTION

BACKGROUND OF THE INVENTION

1. Field of the Invention

The present invention relates to an electric power steering controller provided with a function for detecting the failure of a motor driving direction discrimination means of the electric power steering controller using a motor as its power source.

2. Description of the Prior Art

Such an electric power steering controller has been disclosed in, for example, U.S. Pat. No. 4,896,735. The controller logically compares right-and left-direction driving signals output by a computer in accordance with an output signal of a torque detector with right- and left-direction driving signals output by a motor driving direction discrimination means in accordance with an output signal of the torque detector by an AND circuit. Then, the motor driving direction is determined to be the direction of direction driving signals that match among these driving signals. As a result, it is possible to prevent the steering wheel from rotating due to a failure or runaway of the computer.

In this existing electric power steering controller, the rotational direction driving signal input from a torque detector and judged by a computer is compared with a direction driving signal output from a motor driving direction discrimination means by an AND circuit and the motor driving direction discrimination means enables driving of a motor when both signals coincide with each other. As a result, even if a failure occurs where the computer drives the motor independently of steering torque, it is possible to ensure safety because the motor driving direction is controlled by the motor driving direction discrimination means. However, where there is a failure in the motor driving direction discrimination means so as to enable driving of the motor, it is impossible to ensure safety because the computer cannot detect the failure of the motor driving direction discrimination means. That is, a backup system is not constituted for safety.

SUMMARY OF THE INVENTION

An object of a the present invention is to detect a failure in accordance with an output signal of the motor driving direction discrimination means or a motor terminal voltage or a motor current by monitoring the output state of the motor driving direction discrimination means.

The electric power steering controller according to a first aspect of the invention comprises a motor for supplying a steering force to a steering system, steering torque detection means for detecting a steering force supplied to a steering wheel from a vehicle operator, motor control means for performing right-direction or left-direction drive control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, right-direction discriminating-signal detection means for detecting a right-direction discriminating signal, left-direction discriminating-signal detection means for detecting a left-direction discriminating signal, first failure-discrimination means for judging that the right-direction discrimination means is broken when the output of said steering torque detection means is smaller a fifth predetermined threshold set leftward of and smaller than the third threshold by a value equivalent to a detection error where the output of said right-direction discriminating signal continues for a predetermined time; and second failure-discrimination means for judging that the left-direction discrimination means is broken when the output of said steering torque detection means is smaller than a sixth predetermined threshold set rightward of and smaller than the fourth threshold by a value equivalent to a detection error where the output of said right-direction discriminating signal continues for a predetermined time. Therefore, if a right-direction discriminating signal is detected where the right-direction discrimination means would normally inhibit right driving, it can be judged that the right-direction discrimination means is broken. If a left-direction discriminating signal is detected where the left-direction discrimination means would normally inhibit left driving, it can be judged that the left-direction discrimination means is broken.

The electric power steering controller according to a second aspect of the invention comprises a motor for supplying a steering force to a steering system, steering torque detection means for detecting a steering force supplied to a steering wheel from a vehicle operator, motor control means for performing right-direction or left-direction driving control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, a first AND circuit for outputting a right-driving enabling signal to said motor control means only when said right-direction discriminating signal coincides with the right-direction driving signal, a second AND circuit for outputting a left-driving enabling signal to said motor control means only when the left-direction discriminating signal coincides with the left-direction driving signal, right-driving enabling signal detection means for detecting a right-driving enabling signal, left-driving enabling signal detection means for detecting a left-driving enabling signal, first failure-discrimination means for outputting a right-driving signal when the output of said steering torque detection means is smaller than a fifth predetermined threshold set leftward of and smaller than the third threshold by a value equivalent to a detection error and judging that said right-direction discrimination means or said first AND circuit is broken where the output of the right-driving enabling signal from said first AND circuit continues for a set time, and second failure-discrimination means for outputting a left-driving signal when the output of said steering torque detection means is smaller than a sixth predetermined threshold set rightward of and smaller than the fourth threshold by a value equivalent to a detection error and judging that said left-direction discrimination means or said second AND circuit is broken where the output of the left-driving enabling signal from the said second AND circuit continues for a predetermined time. Therefore, it is possible to judge that the left-direction discrimination means or the AND circuit connected to the left-direction discrimination means is broken.

The electric power steering controller according to a further aspect of the invention comprises a motor for supplying a steering force to a steering system, steering torque detection means for detecting a steering force supplied to a steering wheel from a vehicle operator, motor control means for performing right-direction or left-direction driving control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, a first AND circuit for outputting a right-driving enabling signal to said motor control means only when said right-direction discriminating signal coincides with the right-direction driving signal, a second AND circuit for outputting a left-driving enabling signal to said motor control means only when the left-direction discriminating signal coincides with the left-direction driving signal, neutral point discrimination means for discriminating the vicinity of the neutral point of said steering torque when the output of said steering torque detection means is smaller than a fifth predetermined threshold set leftward of and smaller than the third threshold by a value equivalent to a detection error and smaller than a sixth predetermined threshold set rightward of and smaller than said fourth threshold by a value equivalent to a detection error, motor speed detection means for detecting the rotational speed of a motor, voltage applying means for generating a set voltage at a motor terminal of said motor when said motor is not driven, motor terminal voltage detection means for detecting a terminal voltage of said motor, and failure discrimination means for judging that an AND circuit outputting said driving enabling signal or direction discriminating means outputting a direction discriminating signal to this AND circuit is broken when the output of motor speed detection means is a set value or less, when the vicinity of the neutral point of said steering torque is discriminated by neutral point discrimination means, when a right or left-direction driving signal is output to said first or second AND circuit from said driving signal output means, and when the state in which said terminal voltage shows a value other than said set voltage continues for a predetermined time. Therefore, it is possible to detect a failure of the motor driving direction discrimination means by detecting a motor terminal voltage different from a set voltage.

The electric power steering controller according to a yet further aspect of the invention comprises a motor for supplying a steering force to a steering system, steering torque detection means for detecting a steering force supplied to a steering wheel from a vehicle operator, motor control means for performing right-direction or left-direction driving control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, a first AND circuit for outputting a right-driving enabling signal to said motor control means only when said right-direction discriminating signal coincides with the right-direction driving signal, a second AND circuit for outputting a left-driving enabling signal to said motor control means only when the left-direction discriminating signal coincides with the left-direction driving signal, neutral point discrimination means for discriminating the vicinity of the neutral point of said steering torque when the output of said steering torque detection means is smaller than a fifth predetermined threshold set leftward of and smaller than the third threshold by a value equivalent to a detection error and smaller than a sixth predetermined threshold set rightward of and smaller than said fourth threshold by a value equivalent to a detection error, motor speed detection means for detecting the rotational speed of a motor, motor current detection means for detecting a current flowing through said motor, and failure discrimination means for judging that an AND circuit outputting said driving enabling signal or direction discrimination means outputting a direction discriminating signal to this AND circuit is broken when the output of said motor speed detection means is a set value or less, and when the vicinity of the neutral point of said steering torque is discriminated by said neutral point discrimination means, and when a driving signal for alternately driving said motor rightward and leftward is output from said driving signal output means with motor control means to said first or second AND circuit, and when a state in which the output of said motor current detection means exceeds a set value continues for a predetermined time. Therefore, when the direction discrimination means is normal, the motor current drops to 0 because an AND circuit will not output a driving enabling signal to the motor control means. However, if the direction discrimination means is out of order, it is possible to detect a failure of the motor driving direction discrimination means because the motor control means operates due to the output driving enabling signal and the motor current flows. Moreover, if both right-direction and left-direction discrimination means are broken, it is possible to detect a failure without rotating the motor because the motor is alternately driven rightward and leftward.

The electric power steering controller according to a still further aspect of the invention comprises a motor for supplying a steering force to a steering system, steering torque detection means for detecting a steering force supplied to a steering wheel from a vehicle operator, motor control means for performing right-direction or left-direction driving control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, a first AND circuit for outputting a right-driving enabling signal to said motor control means only when said right-direction discriminating signal coincides with the right-direction driving signal, a second AND circuit for outputting a left-driving enabling signal to said motor control means only when the left-direction discriminating signal coincides with the left-direction driving signal, neutral point discrimination means for discriminating the vicinity of the neutral point of said steering torque when the output of said steering torque detection means is smaller than a fifth predetermined threshold set leftward of and smaller than the third threshold by a value equivalent to a detection error and smaller than a sixth predetermined threshold set rightward of and smaller than said fourth threshold by a value equivalent to a detection error, voltage applying means for generating a set voltage at a terminal of said motor when said motor is not driven, motor terminal voltage detection means for detecting a terminal voltage of said motor, motor rotational-direction detection means for detecting a rotational direction of said motor, and failure discrimination means for judging that an AND circuit outputting said driving enabling signal or direction discrimination means outputting a direction discriminating signal to this AND circuit is broken when the vicinity of the neutral point of said steering torque is discriminated by said neutral point discrimination means, when a right or left-direction driving signal is output to said first or second AND circuit by said driving signal output means in accordance with a detected output of said motor rotational-direction detection means, and when the state where a value other than said set voltage at said terminal of said motor continues for a predetermined time until said motor stops. Therefore, when the direction discrimination means is normal, the motor terminal voltage comes to the set voltage after the maximum time necessary for the motor to stop elapses because the motor control means does not operate. However, if the direction discrimination means is broken and the motor control means is turned on, it is possible to detect a failure of the direction discrimination means even after the maximum time necessary for the motor to stop elapses because the motor terminal voltage does not come to the set voltage.

The electric power steering controller according to a still another aspect of the invention comprises a motor for supplying a steering force to a steering system, a power supply for supplying electric power to said motor, steering torque detection means for detecting a steering force supplied to a steering wheel from a vehicle operator, motor control means including a first switching element connected between a first terminal of said motor and said power supply, a second switching element connected between a second terminal of said motor and said power supply, a third switching element connected between the second terminal of said motor and a ground, and a fourth switching element connected between the first terminal of said motor and a ground, driving signal output means for outputting a right-direction driving signal to said first switching element when the output of said steering torque detection means shows a right-direction torque larger than a first predetermined threshold set to the right of a neutral point and a left-direction driving signal to said second switching means when the output shows a left-direction torque larger than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, a first AND circuit for outputting a right-driving enabling signal to said third switching element only when said right-direction discriminating signal coincides with the right-direction driving signal, a second AND circuit for outputting a left-driving enabling signal to said fourth switching element only when the left-direction discriminating signal coincides with the left-direction driving signal, motor current detection means for detecting a current flowing through said motor, and failure discrimination means for outputting a left-direction driving signal to said second AND circuit when the output of said steering torque detection means shows a value larger than the first threshold, judging that said left-direction discrimination means or said second AND circuit is broken when the state of abnormal motor current detected by said motor current detection means continues for a set time, outputting a right-direction driving signal to said first AND circuit when the output of said steering torque detection means shows a value larger than the second threshold, and judging that said right-direction discrimination means or said first AND circuit is broken when said detected abnormal motor current state continues for a set time. Therefore, even if a driving signal of the opposite direction to the driving direction is output from the driving signal output means while the motor is driven, a transistor for driving the motor in the opposite direction is not turned on because an AND circuit will not output a driving enabling signal when the direction discrimination means is normal. However, because the driving enabling signal is output when the direction discrimination means is broken, feed-through current flows through a transistor turned on by the driving signal and a transistor turned on by the driving enabling signal, which are connected in series between the power supply and ground; the motor current becomes abnormal; and it is possible to detect a failure of the motor driving direction discrimination means.

In a preferred form of the invention, the electric power steering controller further includes first feed-through current prevention means for preventing the first switching element and the fourth switching element from being turned on simultaneously, and second feed-through current prevention means for preventing the a second switching element and the third switching element from being turned on simultaneously, whereby a feed-through current is prevented from escaping when a failure is detected. Therefore, it is possible to prevent a feed-through current by turning off a switching element currently supplying a driving current to the motor in accordance with a driving enabling signal output from an AND circuit due to input of a driving signal of the opposite direction to the driving direction when the feed-through current is made to flow by outputting the opposite-directional driving signal to the driving direction from the driving signal output means and simultaneously turning on two switching elements connected in series between the power supply and the ground. It is also possible to detect a failure of the direction discrimination means by detecting an abnormal motor current when the switching elements are turned off. In this case, the transistors am also protected because no feed-through current flows.

The electric power steering controller according to a still another aspect of the invention comprises a motor for supplying a steering force to a steering system, steering torque detection means for detecting a steering force supplied to a steering wheel from a vehicle operator, motor control means for performing right-direction or left-direction driving control of said motor in accordance with an output of said steering torque detection means, driving signal output means for outputting a right-direction driving signal to said motor control means when the output of said steering torque detection means shows a right-direction torque larger than a first predetermined threshold set to the right of a neutral point and a left-direction driving signal to said motor control means when the output shows a left-direction torque larger- than a second predetermined threshold set to the left of the neutral point, right-direction discrimination means for outputting a right-direction discriminating signal for said motor when the output of said steering torque detection means shows a torque smaller than said first threshold but larger than a third predetermined threshold set smaller than and to the left of said first threshold, left-direction discrimination means for outputting a left-direction discriminating signal for said motor when the output of said steering torque detection means shows a torque smaller than said second threshold but larger than a fourth predetermined threshold set smaller than and to the right of said second threshold, signal cutoff means for forcibly cutting off a direction discriminating signal output from said right-direction discrimination means or left-direction discrimination means, a first AND circuit for outputting a right-driving enabling signal to said motor control means only when the right-direction discriminating signal and the right-direction driving signal output from said right-direction discrimination means coincide with each other, a second AND circuit for outputting a left-driving enabling signal to said motor control means only when the left-direction discriminating signal and the left-direction driving signal output from said left-direction discrimination means coincide with each other, voltage applying means for generating a set voltage at a terminal of said motor when said motor is not driven, motor terminal voltage detection means for detecting a terminal voltage of said motor, and failure discrimination means for judging that an AND circuit outputting said driving enabling signal or direction discrimination means outputting a direction discriminating signal to this AND circuit is broken when said direction discriminating signal is cut off, and when right- or left-direction driving signal is output to said first or second AND circuit from said driving signal output means, and when a state showing a value other than said set voltage continues for a set time. Therefore, when the motor driving direction discrimination means is normal and no signal is being output, the driving enabling signal is not output from the motor control means and the motor terminal voltage comes to the set voltage. However, if the motor driving direction discrimination means or AND circuit is broken and a driving enabling signal is output to the motor control means from an AND circuit, it is possible to detect a failure of the motor driving direction discrimination means independently of the steering torque because an abnormal current flows through the motor and the motor terminal voltage shows a value different from the set voltage.

In a preferred form of the invention wherein vehicle speed detection means for detecting a vehicle speed and stop state judgment means for judging that a vehicle is stopped when an output of said vehicle speed detection means is a set value or less are provided, and the failure judgments described above are performed when said stop state judgment means judges that said vehicle is stopped. Therefore, by detecting a failure of the motor driving direction discrimination means while a vehicle is stopped, it is possible to perform failure detection without a loss in safety even if the motor driving direction discrimination means is broken and the motor abnormally operates due to failure detection.

In a further preferred form of the invention, the electric power steering controller further comprises power cutoff means for cutting off power by disconnecting a motor from a steering system and cutoff state judgment means for judging that said motor is disconnected from said steering system, and the failure judgments described above are performed when said cutoff state judgment means judges that said motor is disconnected from said steering system. Therefore, by mechanically disconnecting the motor from the steering system and thereby detecting a failure of the motor driving direction discrimination means, it is possible to perform failure detection without a loss in safety even if the motor abnormally operated due to failure detection.

It is preferred that failure detection is performed once after starting a vehicle by means for detecting the failure of right-direction and left-direction discrimination means. Accordingly, there is no effect on the original power-steering control after failure detection of the motor driving direction discrimination means because the failure detection is performed only once after starting.

BRIEF DESCRIPTION OF THE DRAWINGS

FIG. 3 comprising

FIG. 4 comprising FIGS. 4a to 4g show the motor current characteristic to steering torque, driving signals, and output signals of the motor driving direction discrimination means;

FIGS. 9 to 11 is a timing chart for explaining operations of this embodiment;

FIGS. 15a to 15g is a timing chart for explaining the operations of this embodiment;

FIG. 17 comprising FIGS. 17a to 17f is a series of timing charts for explaining operations of the sixth embodiment;

FIG. 24 comprising

DESCRIPTION OF THE PREFERRED EMBODIMENTS

Figure 1:
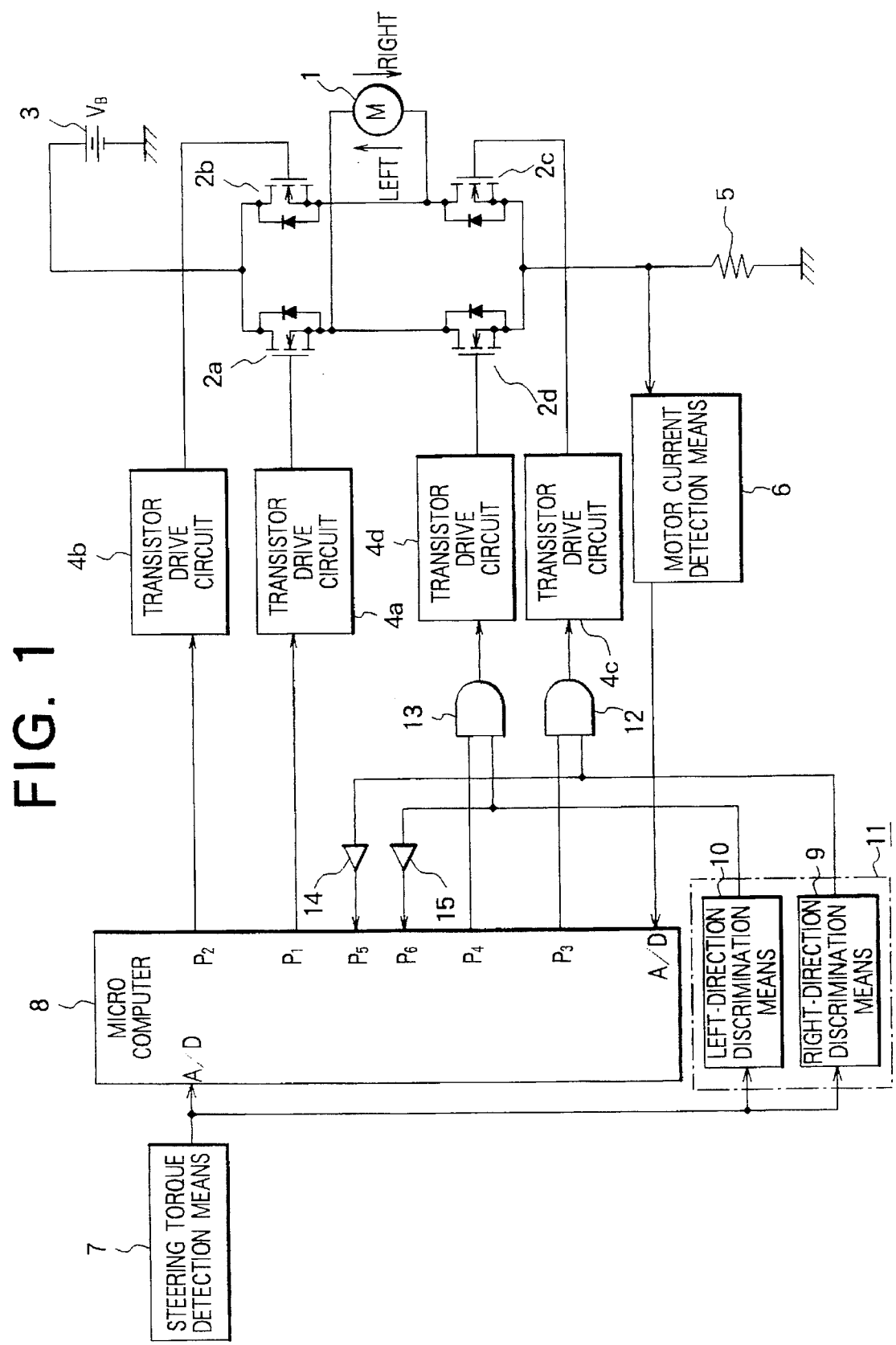
FIG. 1 is a block diagram of the electric power steering controller of a first embodiment of the present invention.

Embodiment 1:

An embodiment of the present invention will be described below by referring to the accompanying drawings. FIG. 1 is a block diagram of the electric power steering controller of this embodiment. A motor 1 for supplying a steering force to a steering wheel is connected to first to fourth transistors 2a to 2d bridge-constituted to drive the motor 1. The first transistor 2a is connected between a positive terminal of a power supply 3 and a first terminal of the motor 1, the second transistor 2b is connected between a positive terminal of the power supply 3 and a second terminal of the motor 1, the third transistor 2c is connected between the second terminal of the motor 1 and the ground, and the fourth transistor 2d is connected between the first terminal of the motor 1 and the ground.

In the first to fourth transistors 2a to 2d, a PWM signal output from a transistor drive circuit 4a is input to the gate of the first transistor 2a. A PWM signal output from a transistor drive circuit 4b is input to the gate of the second transistor 2b. A signal output from a transistor drive circuit 4c is input to the gate of the third transistor 2c. A signal output from a transistor drive circuit 4d is input to the gate of the fourth transistor 2d.

Figure 2:
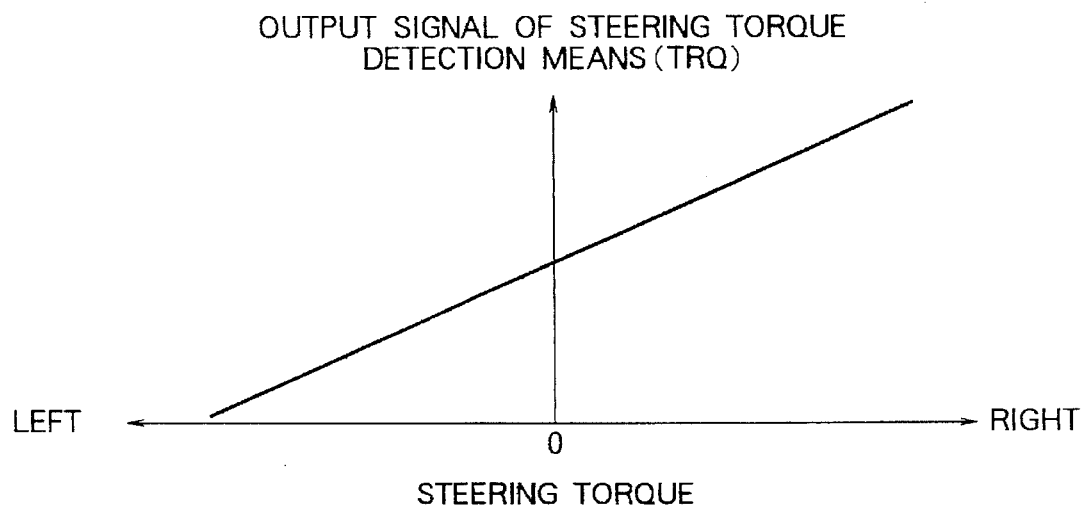
FIG. 2 is a characteristic diagram showing the output characteristic of the steering torque detection means of this embodiment.

A motor current is detected by a voltage generated by a shunt resistance 5 whose one end is connected to drains of the transistors 2c and 2d in common and whose other end is grounded. Motor current detection means 6 samples & holds and amplifies a voltage generated across the shunt resistance 5 to output a voltage corresponding to the motor current. Sampling & holding described here is a function for sampling a current flowing through the shunt resistance 5 synchronously with the on-cycle of a PWM signal and holding a peak current value when the PWM signal is turned on because the waveform of a current flowing through the armature of the motor 1 is different from that of a motor current flowing through the shunt resistance 5. Steering torque detection means 7 detects the steering torque of a steering wheel. FIG. 2 shows the output characteristic of the means 7. When the steering torque is zero, as shown by the output characteristic diagram in FIG. 2, an output signal TRQ with a constant voltage is output, which increases as the steering torque increases rightward and decreases as the steering torque increases leftward.

A microcomputer 8 is programmed so as to determine a motor current in accordance with the output signal TRQ of the steering torque detection means 7 and control the current of the motor 1 by a PWM. The microcomputer 8 outputs a PWM signal for right-driving the motor 1 from a port P1 to the transistor drive circuit 4a. Moreover, the microcomputer 8 outputs a PWM signal for left-driving the motor 1 from port P2 to the transistor drive circuit 4b.

The microcomputer 8 outputs a right-direction driving signal for right-driving the motor 1 from a port P3 and a left-direction driving signal for left-driving the motor 1 from a port P4. Right-direction discrimination means 9 outputs a right-direction discriminating signal in accordance with the output of the steering torque detection means 7. Left-direction discrimination means 10 outputs a left-direction discriminating signal in accordance with the output of the steering torque detection means 7. The right-direction discrimination means 9 and the left-direction discrimination means 10 constitute motor driving direction discrimination means 11.

A first AND circuit 12 outputs a right-driving enabling signal when a right-direction driving signal output from P3 of the microcomputer 8 coincides with a right-direction discriminating signal output from the right-direction discrimination means 9. A second AND circuit 13 outputs a left-driving enabling signal when a left-direction driving signal output from P4 of the microcomputer 8 coincides with a left-direction discriminating signal output from the left-direction discrimination means 10.

Right-direction discriminating signal input means 14 inputs a right-direction discriminating signal output from the right-direction discrimination means 9 to the microcomputer 8. Left-direction discriminating signal input means 15 inputs a left-direction discriminating signal output from the left-direction discrimination means 10 to the microcomputer 8.

Figure 3A:
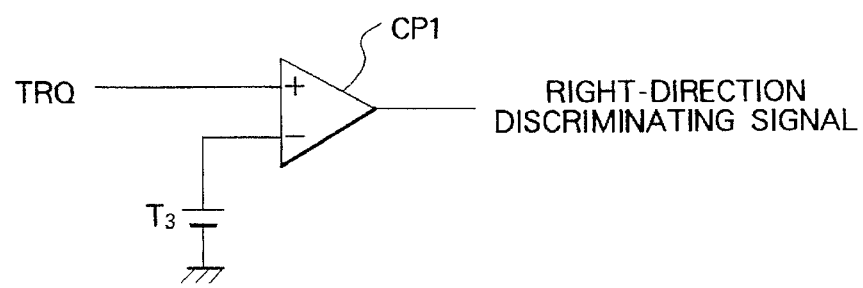
FIGS. 3a and 3b is a series of block diagrams showing the structure of the motor driving direction discrimination means of this embodiment.
Figure 3B:
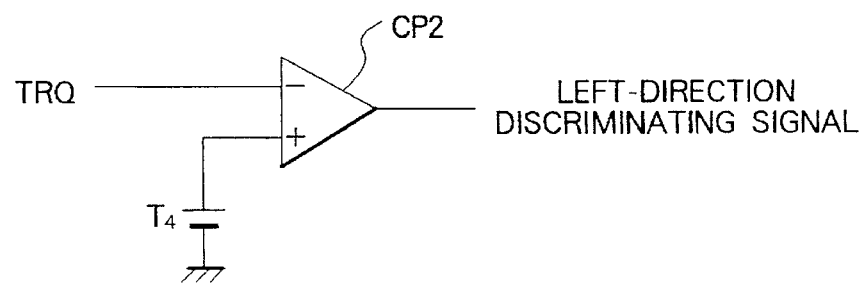

The motor 1 is not driven unless a driving direction output from the microcomputer 8 coincides with a signal output from the motor driving direction discrimination means 11. The right-direction discrimination means 9, as shown in FIG. 3a, comprises a comparator CP1 to whose negative input terminal a positive voltage showing a threshold voltage (hereafter referred to as a threshold) $T_3$ is input and to whose positive input terminal an output signal TRQ of the steering torque detection means 7 is input at a voltage level. The comparator CP1 inverts a right-direction discriminating signal from low to high levels when the output signal TRQ gets larger than the third threshold $T_3$. The left-direction discrimination means 10, as shown in FIG. 3b, comprises a comparator CP2 to whose negative input terminal a positive voltage showing a fourth threshold $T_4$ is input and to whose positive terminal the output signal TRQ of the steering torque detection means 7 is input at a voltage level. The comparator CP2 inverts a left-direction discriminating signal from low to high levels when the output signal TRQ gets smaller than the fourth threshold $T_4$.

This embodiment is described below by referring to FIGS. 4a to 4g. FIG. 4a shows a motor current characteristic corresponding to the output signal TRQ of the steering torque detection means 7. FIG. 4b shows an output signal (right-direction driving signal) of the port P3 corresponding to the output signal TRQ of the steering torque detection means 7, which becomes high when the output signal TRQ reaches the first threshold $T_1$. FIG. 4c shows an output signal (left-direction driving signal) of the port P4 corresponding to the output signal TRQ of the steering torque detection means 7, which becomes high when the output signal TRQ reaches the second threshold $T_2$. FIG. 4d shows an output signal (right-direction discriminating signal) of the right-direction discrimination means 9, which becomes high when the output signal TRQ of the steering torque detection means 7 reaches the third threshold $T_3$. FIG. 4e shows an output signal (left-direction discriminating signal) of the left-direction discrimination means 10, which becomes high when the output signal TRQ of the steering torque detection means 7 reaches the fourth threshold $T_4$.

In this case, $T_5$ represents the fifth threshold of a steering torque and the fifth threshold $T_5$ is set to a value lower than the third threshold $T_3$ by $\epsilon$ equivalent to the sum of detection errors of the right-direction discrimination means 9. $T_6$ is the sixth threshold of the steering torque and the sixth threshold $T_6$ is set to a value higher than the fourth threshold $T_4$ by $\epsilon$ equivalent to the sum of detection errors of the left-direction discrimination means 10. The third threshold of the right-direction discrimination means 9 and the fourth threshold of the left-direction discrimination means 10 are set between the first threshold $T_1$ and the second threshold $T_2$ when the motor 1 is not turned on. Therefore, when the output signal TRQ of the steering torque detection means 7 is higher than the first threshold $T_1$ as the result of right steering, a left-direction driving signal, a left-direction discriminating signal, and an output signal of the port P2 become low. Then, levels of a right-direction driving signal and a right-direction discriminating signal are kept high, the PWM signal is output from the port P1 to the transistor drive circuit 4a, and the motor 1 is driven rightward. However, when an output of the steering torque detection means 7 is lower than the second threshold $T_2$ as the result of left steering, a right-direction driving signal, a right-direction discriminating signal, and an output signal of the port P1 become low. Then, levels of a left-direction driving signal and a left-direction discriminating signal are kept high, the PWM signal is output from the port P2 to the transistor drive circuit 4b, and the motor 1 is driven leftward.

Figure 5:
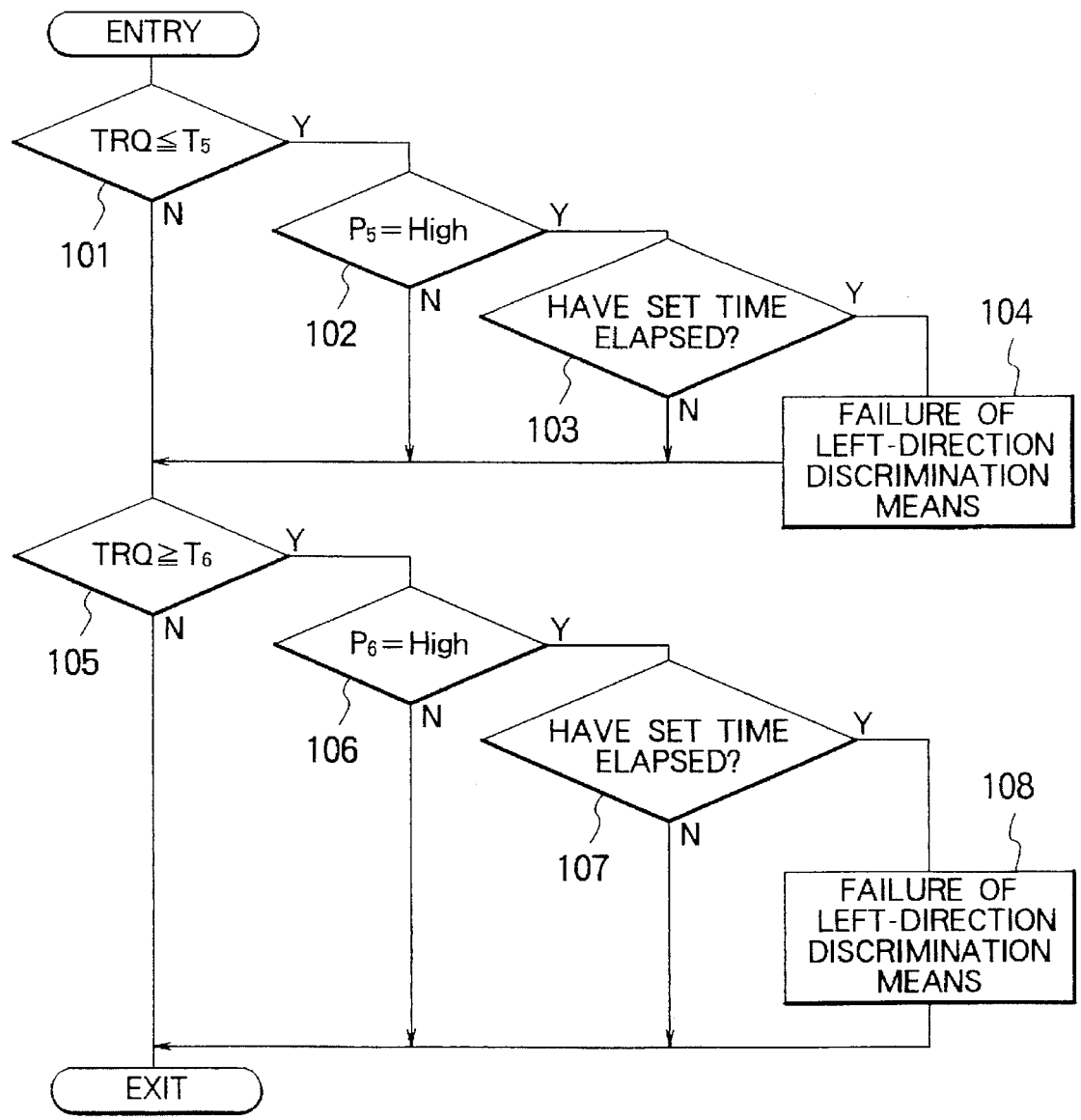
FIG. 5 is a flow chart for explaining operations of this embodiment.

Next, the procedure of failure detection of the motor driving direction discrimination means 11 will be described below by referring to the flow chart in FIG. 5. In the case of detecting a failure of the right-direction discrimination means 9, when the value of the output signal TRQ of the steering torque detection means 7 is equal to or lower than the fifth threshold $T_5$ (step 101) and the state in which the level of an output signal of the right-direction discrimination means 9 input from the port P5 is kept high (step 102) continues for a set time (step 103), the microcomputer 8 judges that the right-direction discrimination means 9 is broken (step 104).

In the case of failure detection of the left-direction discrimination means 10, when the value of the output signal TRQ of the steering torque detection means 7 is equal to or higher than the sixth threshold $T_6$ (step 105) and the state in which an output of the left-direction discrimination means 10 input from the port P6 is kept high (step 106) continues for a set time (step 107), the microcomputer 8 judges that the left-direction discrimination means 10 is broken (step 108). When the microcomputer 8 judges in step 104 or 108 that direction discrimination means is broken, the signal levels of the output ports P1, P2, P3, and P4 of the microcomputer 8 are made low to stop the motor 1 until the system stops in step 405 in the main program shown in FIG. 29.

Failure detection of the motor driving direction discrimination means 11 by this embodiment can always be performed without influencing the original control of an electric power steering. Moreover, even when the third threshold $T_3$ of the right-direction discrimination means 9 is set to the left of the neutral point as shown in FIG. 4f and the fourth threshold $T_4$ of the left-direction discrimination means 10 is set to the right of the neutral point as shown in FIG. 4g, failure detection can be performed. Furthermore, failure detection can be performed even when the third threshold $T_3$ of the right-direction discrimination means 9 is equal to the fourth threshold $T_4$ of the left-direction discrimination means 10.

Figure 6:
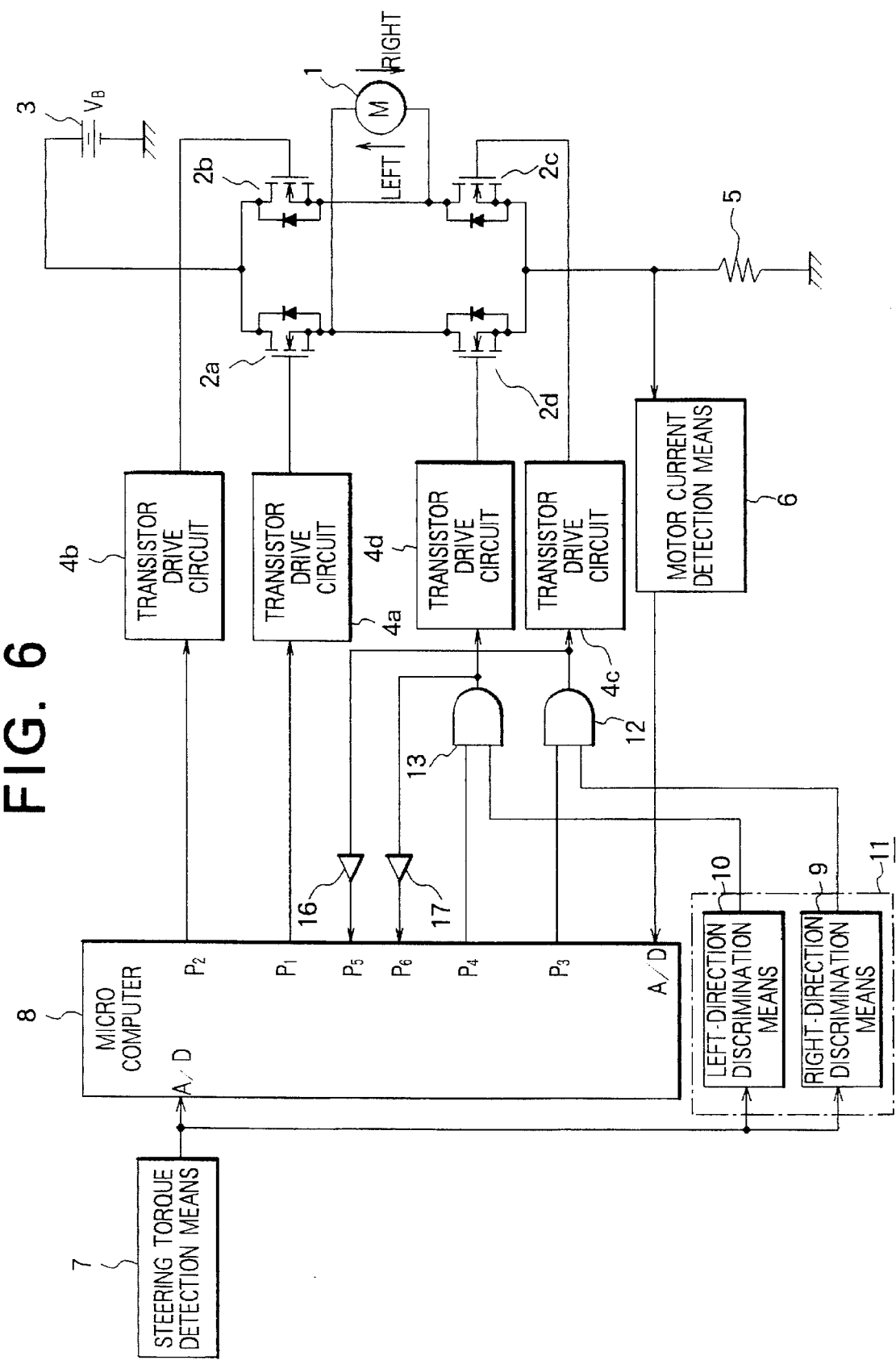
FIG. 6 is a block diagram of the electric power steering controller of the second embodiment of the present invention.

Embodiment 2:

In the case of the above embodiment, only a failure of motor driving direction discrimination means is detected. However, it is also possible to detect a failure of the first and second AND circuits 12 and 13 for outputting a driving enabling signal at the same time. FIG. 6 shows a block diagram of the electric power steering controller of this embodiment. In FIG. 6, symbols similar to those in FIG. 1 represent portions similar or equivalent to those in FIG. 1. Right-driving enabling signal input means 16 inputs a right-driving enabling signal to the port P5 serving as an input port of the microcomputer 8. Left-driving enabling signal input means 17 inputs a left-driving enabling signal to the port P6 serving as an input port of the microcomputer 8.

Figure 7:
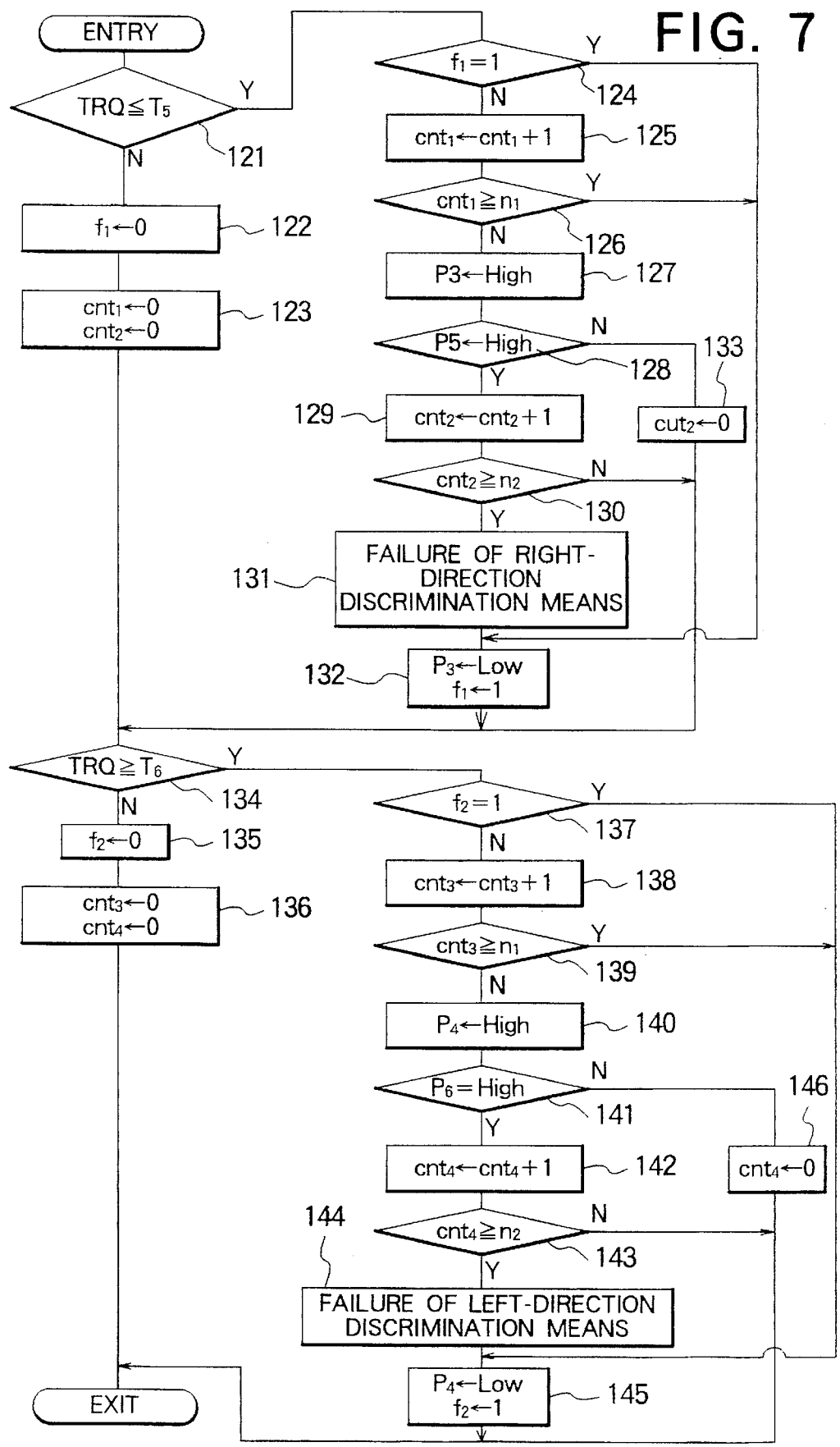
FIG. 7 is a flow chart for explaining the operations of the second embodiment.

Next, operations of this embodiment will be described below by referring to the flow chart in FIG. 7 and previously-described FIGS. 2, 3, and 4. First, failure detection of the right-direction discrimination means 9 is performed in accordance with the following steps. When the value of the output signal TRQ of the steering torque detection means 7 is equal to or lower than the fifth threshold $T_5$ (step 121) and a failure detection termination flag f1 for the right-direction discrimination means 9 is set to 0 (step 124), a counter $cnt_1$ is counted up (step 125) and a high-level signal is output to the first AND circuit from the port P3 (step 127) until the counter $cnt_1$ reaches a set value $n_1$ (step 126).

When the right-direction discrimination means 9 is broken and a right-direction discriminating signal is kept high, the signal is input to the first AND circuit 12 and a high-level signal is output from the first AND circuit 12. Therefore, the microcomputer 8 monitors the signal level of the port P5 and counts up a counter $cnt_2$ when the level is high. However, when the signal level of the port P5 is low, the microcomputer 8 sets the counter $cnt_2$ to 0 (steps 128, 129, and 133). When the counter $cnt_2$ reaches a set value $n_2$, the microcomputer judges that the right-direction discrimination means 9 is broken (step 131), makes the output signal level of the port P3 low, and sets the failure detection termination flag f1 to 1 (step 132).

When the time (counted value $n_1$) set in steps 125 and 126 elapses before a failure is determined, it is judged that the right-direction discrimination means 9 is normal and failure detection terminates. Hereafter, because a failure detection termination flag is checked in step 124, failure detection of the right-direction discrimination means 9 is not performed until the value of the output signal TRQ of the steering torque detection means 7 exceeds the fifth threshold $T_5$ and the failure detection termination flag f1 and the counters $cnt_1$ and $cnt_2$ are cleared (steps 122 and 123).

Then, failure detection of the left-direction discrimination means 10 is performed in accordance with the following steps. When the value of the output signal TRQ of the steering torque detection means 7 is equal to or higher than the sixth threshold $T_6$ (step 134) and a failure detection termination flag f2 for the left-direction discrimination means 10 is set to 0 (step 137), a counter $cnt_3$ is counted up (step 138), and a high-level signal is output from the port P4 (step 140) unless the counter $cnt_3$ reaches the set value $n_1$ (step 139).

When the left-direction discrimination means 10 is broken and the level of a left-direction discriminating signal is kept high, a high-level signal is output from the second AND circuit 13. Therefore, the microcomputer 8 monitors the signal level of the port P6, and counts up a counter $cnt_4$ when the signal level is high but sets the counter $cnt_4$ to 0 when the level is low (steps 141, 142, and 146). When the set value of the counter $cnt_4$ reaches the set value $n_2$, the microcomputer 8 judges that the left-direction discrimination means 10 is broken (step 144) and sets an output signal of the port P4 to the low level and the failure detection flag f2 to 1 (step 145). When the time set in steps 138 and 139 elapses before a failure is determined, it is judged that the left-direction discrimination means 10 is normal and failure detection terminates.

Hereafter, because the failure detection termination flag f2 is checked in step 137, failure detection of the left-direction discrimination means 10 is not performed until the value of the output signal TRQ of the steering torque detection means 7 becomes lower than the sixth threshold $T_6$ and the failure detection termination flag f2 and the counters $cnt_3$ and $cnt_4$ are cleared (steps 135 and 136). When it is judged that the left-direction discrimination means 10 is broken in step 131 or 144, the signal levels of the ports P1, P2, P3, and P4 are made low in step 405 in the main program shown in FIG. 29 to stop the motor 1.

In the case of this embodiment, failure detection is performed only for the time set to the value $n_1$ after the value of the output signal TRQ of the steering torque detection means 7 becomes the fifth threshold $T_5$ or lower or the sixth threshold $T_6$ or higher. However, it is also possible to perform failure detection of the right-direction discrimination means 9 whenever the value of the output signal TRQ of the steering torque detection means 7 is equal to or lower than the fifth threshold $T_5$ and perform failure detection of the left-direction discrimination means 10 whenever the value of the output signal TRQ of the steering torque detection means 7 is equal to or higher than the sixth threshold $T_6$.

This embodiment makes it possible to perform failure detection of the first and second AND circuits 12 and 13 simultaneously with failure detection of the motor driving direction discrimination means 11. That is, it is judged whether the first or second AND circuit 12 or 13 is broken when the transistor 2c or 2d is turned on while no right-direction or left-direction driving signal is being output from the microcomputer 8 to the first or second AND circuit 12 or 13. Moreover, it is possible to perform failure detection even when the third threshold $T_3$ of the right-direction discrimination means 9 is set at the left of the neutral point as shown in FIG. 4f and the fourth threshold $T_4$ of the left-direction discrimination means 10 is set at the right of the neutral point as shown in FIG. 4g. Furthermore, it is possible to perform failure detection even when the third threshold $T_3$ of the right-direction discrimination means 9 is equal to the fourth threshold $T_4$ of the left-direction discrimination means 10.

Figure 8:
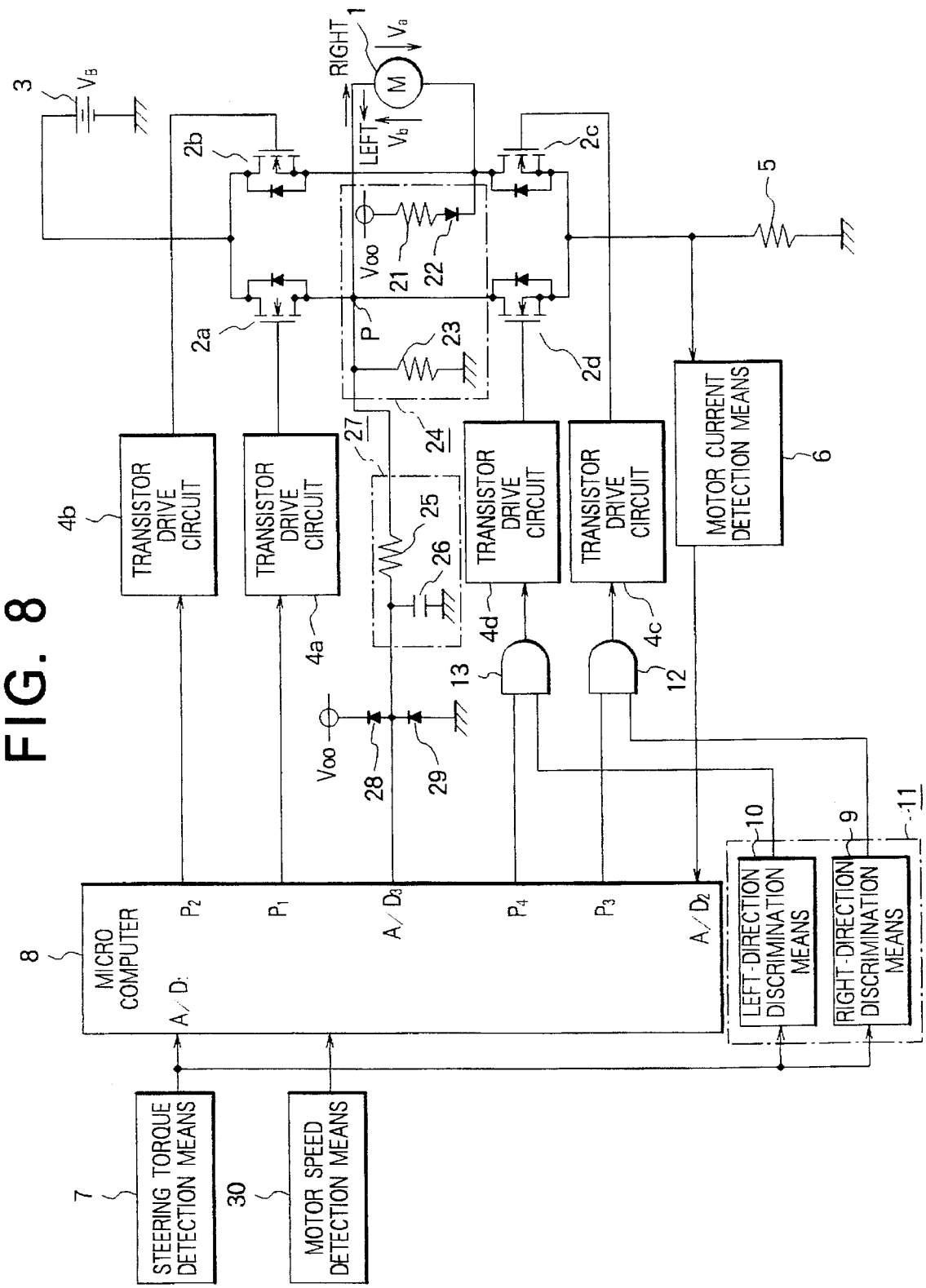
FIG. 8 is a block diagram of the electric power steering controller of the third to sixth embodiments of the present invention.

Embodiment 3:

In the case of an electric power steering controller constituted so as to use a terminal voltage of the motor 1 for power steering control, it is also possible to detect failures of the motor driving direction discrimination means 11 and the first and second AND circuits 12 and 13 by detecting changes of the motor terminal voltage. FIG. 8 is a block diagram of the electric power steering controller of this embodiment. In FIG. 8, symbols similar to those in FIG. 1 show portions similar or equivalent to those in FIG. 1.

A resistance 21 having a value large enough for the resistance value of the motor 1 is connected to one end of a power supply Vcc for driving the microcomputer 8. A diode 22 connected to the second terminal of the motor 1 is connected with the other end of the resistance 21 in the forward direction. The diode 22 prevents the current of a power supply 3 from inversely flowing to the power supply Vcc when the second transistor 2b is turned on. Moreover, another resistance 23 having a value large enough for the resistance value of the motor 1 is connected between the first terminal of the motor 1 and the ground. The resistances 21 and 23 and the diode 22 constitute voltage applying means 24 for applying a voltage to the motor 1.

A filer circuit 27 comprising a resistance 25 and a capacitor 26 connects with the first terminal of the motor 1 to smooth and output a motor terminal voltage at a point P. The upper limit of the smoothed motor terminal voltage is clipped at the power supply voltage Vcc by a diode 28. The lower limit of the smoothed motor terminal voltage is clipped at the ground level by a diode 29. The clipped motor terminal voltage is input to the microcomputer 8 through a terminal $A/D_3$ of the microcomputer 8.

Figure 9:
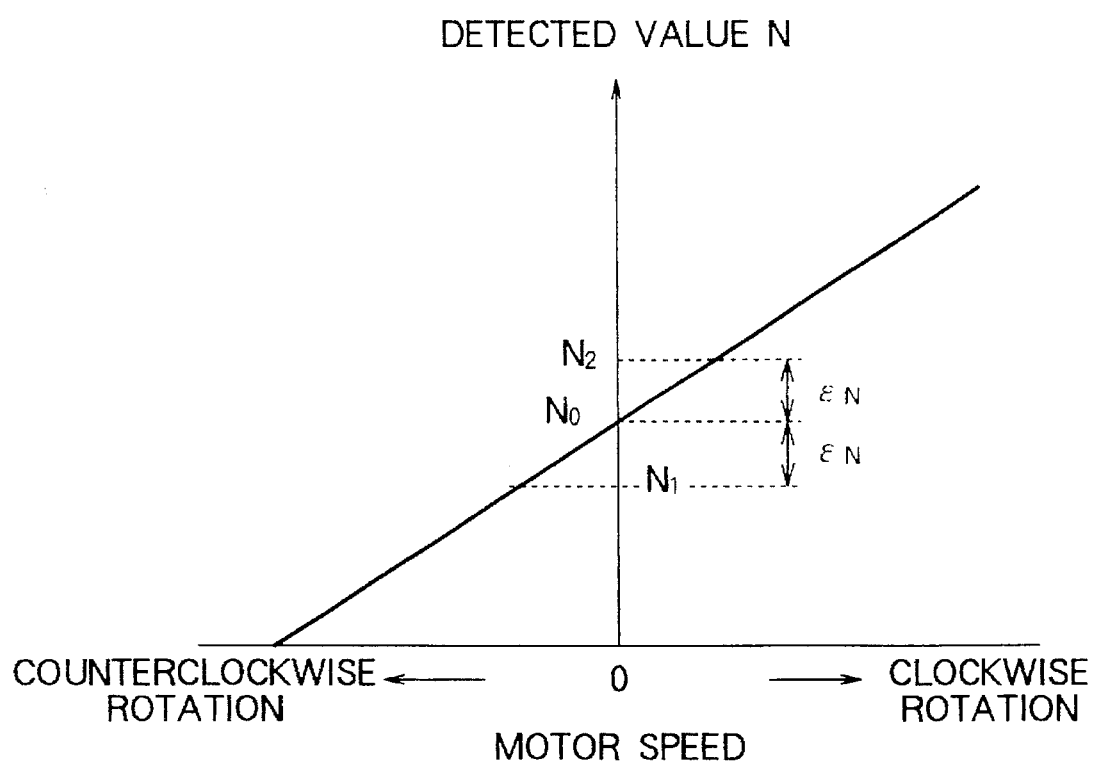
FIG. 9 is a characteristic diagram showing the output characteristic of the motor speed detection means of these embodiments.
Figure 10:
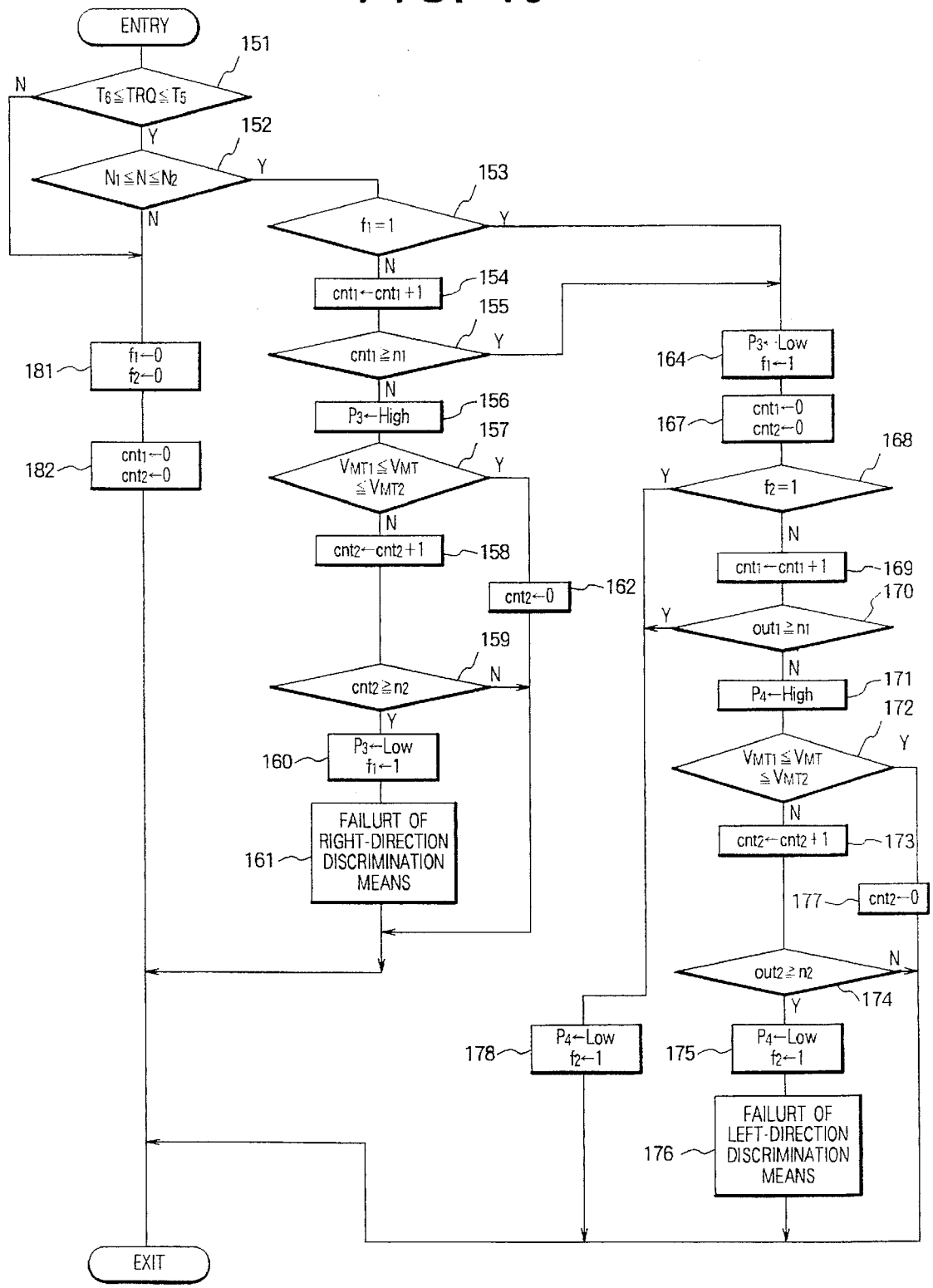
FIG. 10 is a flow chart for explaining the operations of the third embodiment.

Because the rotational speed of the motor 1 is detected by motor speed detection means 30, the microcomputer 8 obtains the value shown in FIG. 9 from the motor speed detection means 30. In this case, symbol sN represents a level to be judged while the motor 1 stops. When a detected value N0 is present between N1 and N2, it is judged that the motor 1 is stopped. Then, the level of a detected value N rises as the rightward rotational speed increases but it lowers toward zero as the leftward rotational speed increases.

Next, operations of this embodiment will be described below by referring to the flow chart in FIG. 10 and FIGS. 2, 3, and 4. First, if the failure detection termination flag f1 of the right-direction discrimination means 9 is 0 (step 153) when the steering torque is neutral and the motor 1 is stopped (steps 151 and 152), the counter $cnt_1$ is counted up (step 154). Unless the counter $cnt_1$ reaches the set value $n_1$ (step 155), the microcomputer 8 outputs a high-level signal through the port P3. In this case, the microcomputer 8 counts up the counter $cnt_2$ unless a motor terminal voltage VMT generated at a contact P is present between set values VMT1 and VMT2 but the microcomputer 8 sets the counter $cnt_2$ to 0 when the voltage VMT is present between the set values VMT1 and VMT2 (steps 157, 158, and 162). When the counter $cnt_2$ reaches the set value $n_2$, the microcomputer 8 sets a signal of the port P3 to the low level and the failure detection termination flag f1 to 1 (step 160), and judges that right-direction discrimination means 9 is broken (step 161).

When the counter $cnt_1$ reaches the set value $n_1$ before the microcomputer 8 judges that the right-direction discrimination means 9 is broken, the microcomputer 8 judges that the right-direction discrimination means 9 is normal, sets a signal of the port P3 to the low level and the failure detection termination flag f1 to 1, and clears the counters $cnt_1$ and $cnt_2$ to 0 (steps 164 and 167). Thus, failure detection of the right-direction discrimination means 9 terminates.

Then, if the failure detection termination flag f2 of the left-direction discrimination means 10 is 0 (step 168), the microcomputer 8 counts up the counter $cnt_1$ (step 169). In this case, unless the counter $cnt_1$ reaches the set value $n_1$ (step 170), the microcomputer 8 outputs a high-level signal from the port P4 (step 171). Moreover, the microcomputer 8 counts up the counter $cnt_2$ unless the motor terminal voltage VMT is present between the set values VMT1 and VMT2 but it sets the counter $cnt_2$ to 0 when the motor terminal voltage VMT is present between the set values VMT1 and VMT2 (steps 172, 173, and 177). When the counter $cnt_2$ reaches the set value $n_2$, the microcomputer 8 sets a signal at the port P4 to the low level and the failure detection termination flag f2 to 1 (step 175), and judges that the left-direction discrimination means 10 is broken (step 176). When the counter $cnt_1$ reaches the set value $n_1$ before it is judged that the left-direction discrimination means 10 is broken, the microcomputer 8 judges that the left-direction discrimination means 10 is normal and sets a signal of the port P4 to the low level and the failure detection termination flag f2 to 1 (step 178).

Because the flags f1 and f2 are set to I when failure detection terminates, failure detection is not performed in steps 153 and 168. However, when the value of the output signal TRQ of the steering torque detection means 7 is lower than the sixth threshold $T_6$ or exceeds the fifth threshold $T_5$ (step 151 ), or it is judged that the motor 1 is rotated in accordance with an output of the motor speed detection means 30 (step 152), the microcomputer 8 sets the failure detection termination flags f1 and f2 to 0 and the counters $cnt_1$ and $cnt_2$ to 0 (steps 181 and 182). Therefore, when the conditions of steps 151 and 152 are effected again, the microcomputer 8 performs failure detection. However, if it is judged in step 161 or 176 that the left-direction discrimination means 10 is broken, the microcomputer 8 keeps P1, P2, P3, and P4 at the low level and stops the motor 1 until the system stops in step 405 in the main program shown in FIG. 29.

FIGS. 11a to 11i show operational waveforms of the controller when processing is performed as described above. FIG. 11a shows the output signal TRQ of the steering torque detection means 7, in which the steering torque shifts to the neutral point as time passes and the value of the output signal TRQ converges between the fifth threshold $T_5$ and the sixth threshold $T_6$. FIG. 11b shows the motor speed signal N obtained from the motor speed detection means 30, in which the rotational speed of the motor 1 approaches 0 as the value of the output signal TRQ converges between the fifth threshold $T_5$ and the sixth threshold $T_6$.

FIG. 11c shows a right-direction driving signal output from the port P3, which is kept at the high level while the value of the output signal TRQ is present at the right of the first threshold $T_1$ and at the low level while the value is present at the left of the first threshold $T_1$. Then, the signal level of the port P3 is made high for the period $n_1$ for failure detection of the right-direction discrimination means 9 from the time when the output signal TRQ reaches the neutral point.

FIG. 11d shows a left-direction driving signal output from the port P4, which is kept at the low level when the value of the output signal TRQ is present at the right of the second threshold $T_2$. Then, the signal level of the port P3 is made high for the period $n_1$ for failure detection of the right-direction discrimination means 9 and thereafter, the signal level of the port P4 is made high for the period $n_1$ for failure detection of the left-direction discrimination means 10.

FIG. 11e shows an input signal of the A/D3 when the motor driving direction discrimination means 11 is normal. When the steering torque reaches the neutral point, it stays between the third and fourth thresholds $T_3$ and $T_4$. Therefore, the right-direction discrimination means 9 and the left-direction discrimination means 10 do not output right and left direction discriminating signals to the first and second AND circuits. Therefore, even when a high-level right-direction driving signal and left-direction driving signal are output to the first and second AND circuits 12 and 13, the first and second AND circuits 12 and 13 do not output right- and left-driving enabling signals. Therefore, the third and fourth transistors 2c and 2d are not turned on and the motor terminal voltage becomes equal to the set VMT0.

FIG. 11f shows an input signal of the ND3 of the microcomputer 8 when the right-direction discrimination means 9 is broken. When a high-level right-direction driving signal is input to the first AND circuit 12 from the port P3 while the right-direction discrimination means 9 is broken and a high-level right-direction discriminating signal is output to the first AND circuit 12, the third transistor 2c is turned on. As a result, the motor terminal voltage VTM lowers from VTM0 to 0 level.

FIG. 11g shows an input signal of the A/D3 when the left-direction discrimination means 10 is broken. When a high-level left driving direction signal is input to the second AND circuit 13 while the left-direction discrimination means 10 is broken and a high-level left-direction discriminating signal is output to the second AND circuit 13, the fourth transistor 2d is turned on. As a result, the motor terminal voltage VTM lowers from VTM0 to 0 level.

Figure 12:
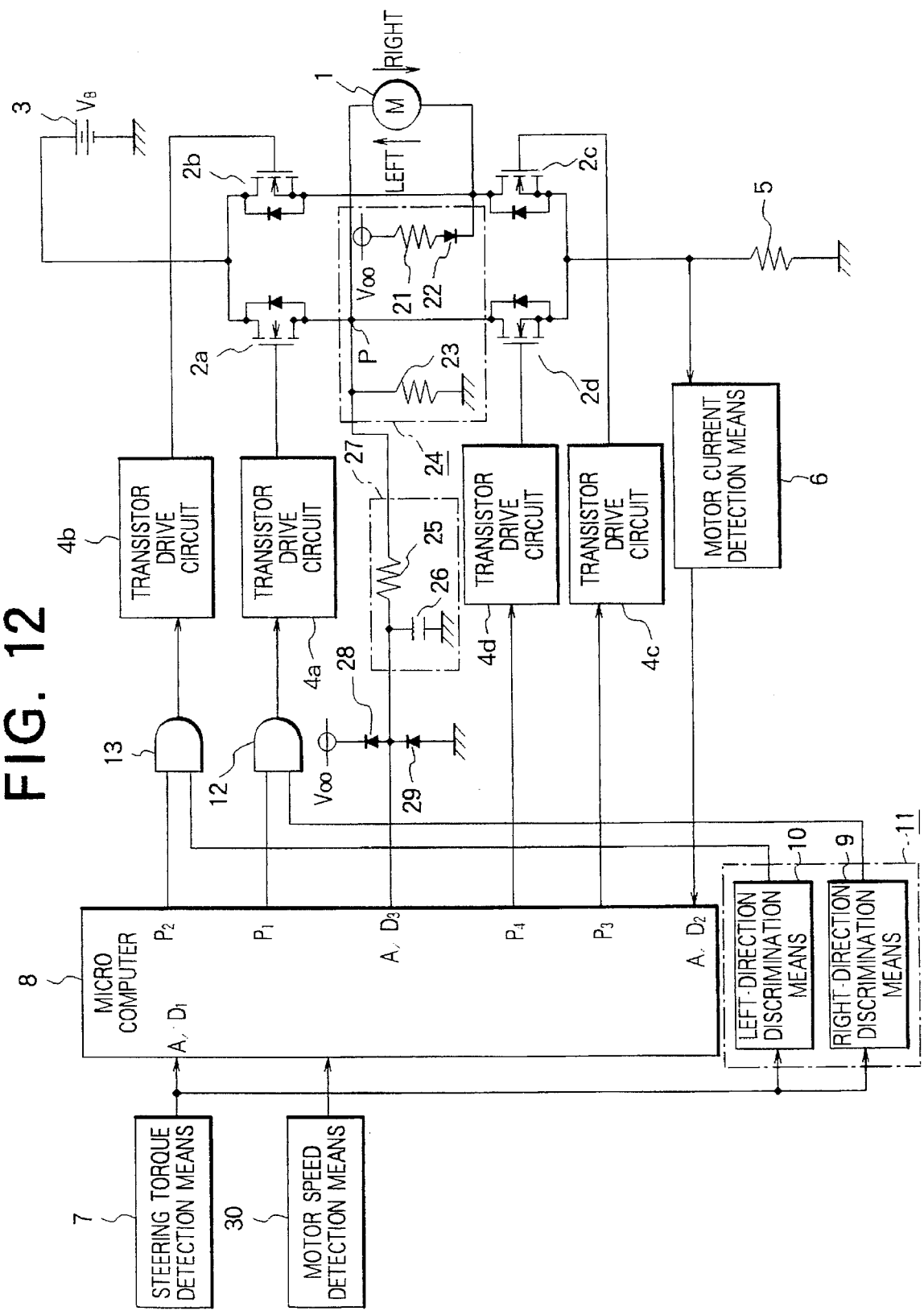
FIG. 12 is a block diagram of the electric power steering controller of the fourth embodiment of the present invention.

Embodiment 4:

In the above embodiments, it is judged that the right-direction discrimination means 9 or left-direction discrimination means 10 is broken by detecting that the motor terminal voltage VTM lowers to 0 level when inputting a right driving direction signal or left driving direction signal to the first or second AND circuit 12 or 13. However, by constituting the controller as shown in FIG. 12, it is possible to judge that the right-direction discrimination means 9 or left-direction discrimination means 10 is broken when the motor terminal voltage VTM rises up to VTM2 or higher.

That is, the first AND circuit 12 of the controller is constituted so as to turn on the first transistor $2a$ when the level of a right-direction discriminating signal output from the right-direction discrimination means 9 coincides with that of a right-direction driving signal output from the port P1. Moreover, the second AND circuit 13 is constituted so as to turn on the second transistor $2b$ when the level of a left-direction discriminating signal output from the left-direction discrimination means 10 coincides with that of a left-direction driving signal output from the port P2.

Therefore, the first transistor $2a$ is turned on when a right driving direction signal is input to the first AND circuit 12 from the port P1 while right- and left-direction driving signals are not output from the ports P3 and P4, the transistors $2c$ and $2d$ are turned off, the right-direction discrimination means 9 is broken, and a high-level right-direction discriminating signal is output to the first AND circuit 12. As a result, as shown in FIG. 11$h$, the motor terminal voltage VTM at the point P rises up to VTM2 or higher because the voltage of the power supply 3 is superimposed on VTM0.

Figure 13:
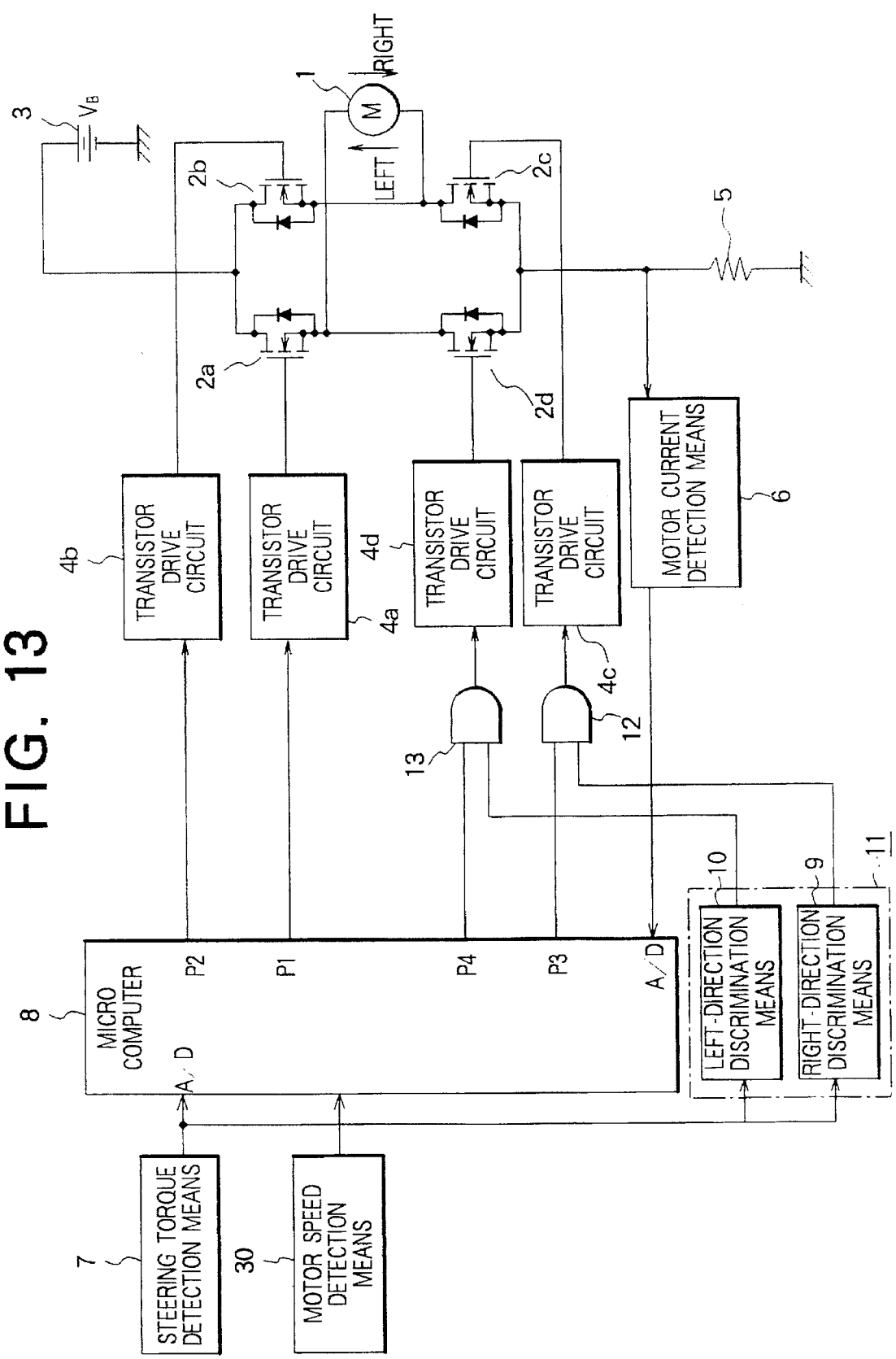
FIG. 13 is a block diagram of the electric power steering controller of the fifth embodiment of the present invention.
Figure 14:
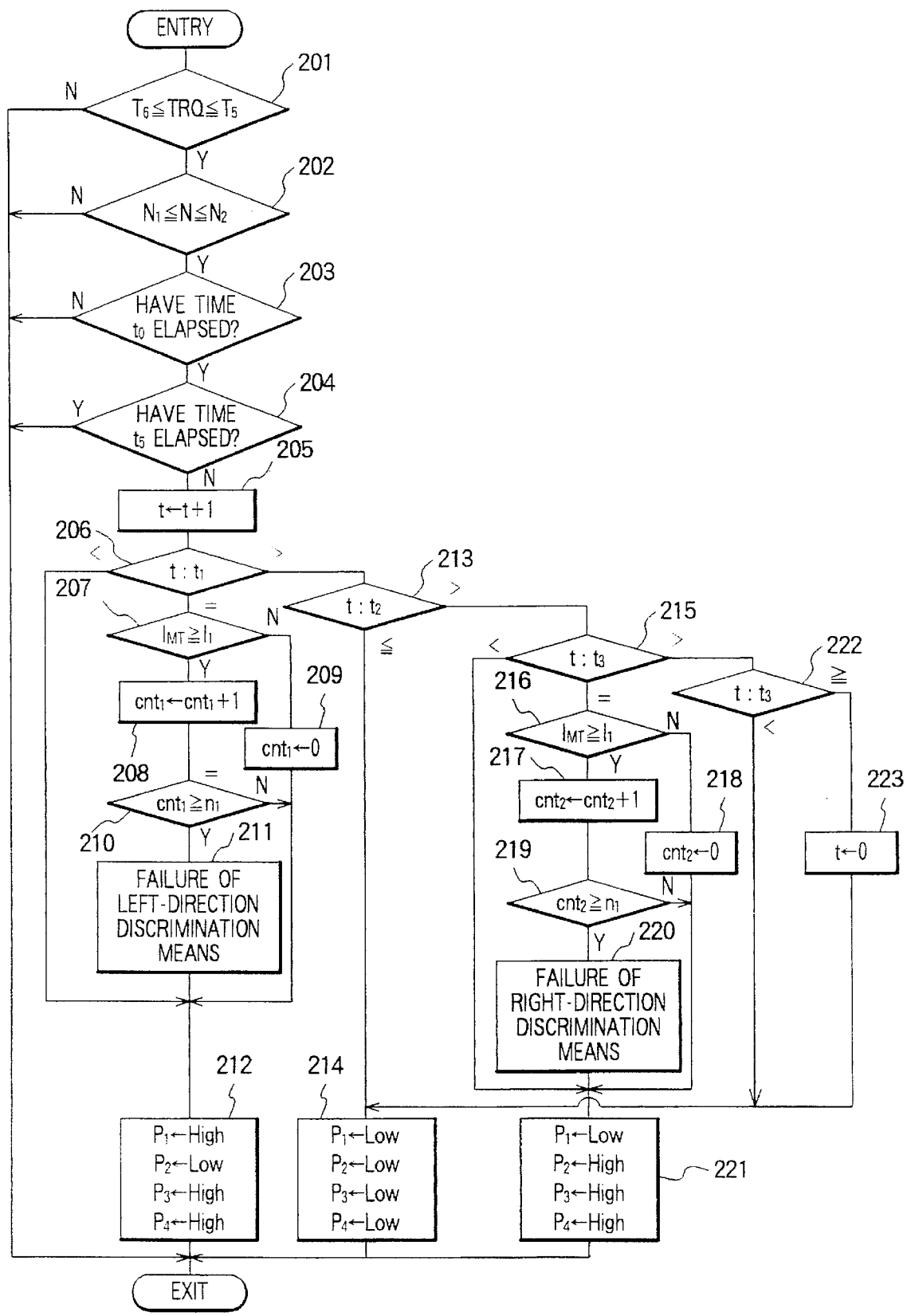
FIG. 14 is a flow chart for explaining the operations of this embodiment.

Conversely, the second transistor $2b$ is turned on when a left driving direction signal is input to the second AND circuit 13 from the port P2 while the third and fourth transistors $2c$ and $2d$ are turned off, the left-direction discrimination means 10 is broken, and a high-level left-direction discriminating signal is output to the second AND circuit 13. As a result, as shown in FIG. 11$i$, the motor terminal voltage VTM at the point P rises up to VTM2 or higher because the voltage of the power supply 3 is superimposed on Embodiment 5:

This embodiment judges that motor driving direction discrimination means is broken in accordance with an abnormal current flowing through the motor 1 when alternately outputting signals for driving the motor 1 rightward and leftward. FIG. 13 is a block diagram of the electric power steering controller of this embodiment. In FIG. 13, symbols similar to those in FIG. 12 represents portions similar or equivalent to those in FIG. 12.

Operations of this embodiment will be described below by referring to the flow chart in FIG. 14 and FIGS. 2, 3, 4, and 9. The following processes are executed until a set time $t_5$ elapses (step 204) after a state in which the output signal TRQ obtained from the steering torque detection means 7 is neutral (step 201) and it is judged from the signal N obtained from the motor speed detection means 30 that the stopped state of the motor 1 continues for a set time $t_0$ (step 203).

First, the microcomputer 8 counts up a counter t whenever executing this processing (step 205) and outputs high-level signals from the ports P1, P3, and P4 and low-level signals from the port P2 until the counter t reaches the set value $t_1$ (step 212). The microcomputer 8 detects a motor current when the counter t reaches the set value $t_1$ by the motor current detection means 6, and counts up the counter $cnt_1$ when a detected value IMT is equal to or larger than a set value $I_1$ but sets the counter to 0 if the value IMT is less than the value $I_1$ (steps 207, 208, and 209).

When the counter $cnt_1$ reaches the set value $n_1$, the microcomputer 8 judges that left-direction discrimination means is broken (steps 210 and 211). This is, as shown in FIG. 15, if the right-direction discrimination means 9 and the left-direction discrimination means 10 are normal when the signal levels of the ports P3 and P4 are made high while the first transistor $2a$ is turned on, outputs of the first and second AND circuits 12 and 13 are made low, the third and fourth transistors $2c$ and $2d$ are turned off, and no motor current flows independently of the high-level state of the signals of the ports P3 and P4 (see FIG. 15$e$).

However, if the left-direction discrimination means 10 is broken and a high-level left-direction discriminating signal is output to the second AND circuit 13 though the steering torque is at the neutral point, the fourth transistor $2d$ is turned on. Then, a short-circuit current equal to or greater than the set current $I_1$ shown in FIG. 15$g$ flows through the first and fourth transistors $2a$ and $2d$.

Then, the ports P1, P2, P3, and P4 output low-level signals while a counted value of the counter t is present between set values $t_1$ and $t_2$ (steps 213 and 214). While the counted value of the counter t is present between the set values $t_1$ and $t_2$, the port P1 outputs low-level signals and the ports P2, P3, and P4 output high-level signals (steps 215 and 221). When the counted value of the counter t reaches a set value $t_3$, the counter $cnt_2$ is counted up if the value IMT of the motor current detected by the motor current detection means 6 is equal to or more than the set value $I_1$ but a counted value of the counter $cnt_2$ is set to 0 if the value IMT is less than the set value $I_1$ (steps 216, 217, and 218). When a counted value of the counter $cnt_2$ reaches the set value $n_1$, it is judged that the right-direction discrimination means 9 is broken (steps 219 and 220).

That is, as shown in FIG. 15, if the microcomputer 8 sets the signals of the pods P3 and P4 to the high level while turning on the second transistor $2b$, outputs of the first and second AND circuits 12 and 13 are made low independently of the high-level signals of the pods P3 and P4 when the right-direction discrimination means 9 and the left-direction discrimination means 10 are normal. Therefore, the third and fourth transistors $2c$ and $2d$ are turned off and no motor current flows (see FIG. 15$e$).

However, if the right-direction discrimination means 9 is broken and a high-level left-direction discriminating signal is output to the first AND circuit 12 though the steering torque is at the neutral point, the third transistor $2c$ is turned on. Thus, a short-circuit current equal to or greater than the set current $I_1$ shown in FIG. 15$f$ flows through the second and third transistors $2b$ and $2c$.

When the counted value of the counter t is present between set values $t_3$ and $t_4$ (step 222), the ports P1, P2, P3, and P4 output low-level signals (step 214). When the counted value of the counter t reaches the set value $t_4$, the counter t is cleared (step 223) and thereafter, the same processing is repeated until the set time $t_5$ elapses (step 204). When the means 9 or 10 is broken in step 211 or 220, output signals of the ports P1, P2, P3, and P4 are set to the low level in step 405 in the main program shown in FIG. 29 until the system stops and the motor 1 is stopped.

FIGS. 15$a$ to 15$g$ show operational waveforms when the above processing is performed. In FIGS. 15$a$ to 15$g$, FIG. 15($a$) shows an output waveform of the port P1, FIG. 15$b$ shows an output waveform of the port P2, FIG. 15$c$ shows an output waveform of the port P3, FIG. 15$d$ shows an output waveform of the pod P4, FIG. 15$e$ shows an output signal IMT of the motor current detection means 6 when both the right-direction discrimination means 9 and the left-direction discrimination means 10 are normal, FIG. 15$f$ shows an output signal IMT of the motor current detection means 6 when the right-direction discrimination means 9 is broken, and FIG. 15g shows an output signal IMT of the motor current detection means 6 when the left-direction discrimination means 10 is broken, and ①represents the motor current detection timing in step 207 and ②represents the motor current detection timing in step 216, and the time ta coincides with $t_1$ or $t_3$–$t_2$ when the first and second transistors 2a and 2b are turned on and the time tb coincides with $t_2$–$t_1$ or $t_4$–$t_3$ when the first and second transistors 2a and 2b are turned on.

By performing the above processing, it is possible to detect a failure of the motor driving direction discrimination means 11 including the first and second AND circuits 12 and 13. Moreover, by setting the on-time ta of the motor 1 small enough for the mechanical time constant of the motor and the off-time of the motor 1 large enough for the mechanical time constant, it is possible to ease the shock from the motor 1 to a steering wheel when the motor driving direction discrimination means 11 is broken. Furthermore, when both the right-direction discrimination means 9 and the left-direction discrimination means 10 are broken, it is possible to prevent the steering wheel from rotating without rotating the motor 1 because the motor 1 is alternately driven rightward and leftward. Furthermore, by using an observer for the motor speed detection means 30, it is possible to decrease the cost.

Figure 16:
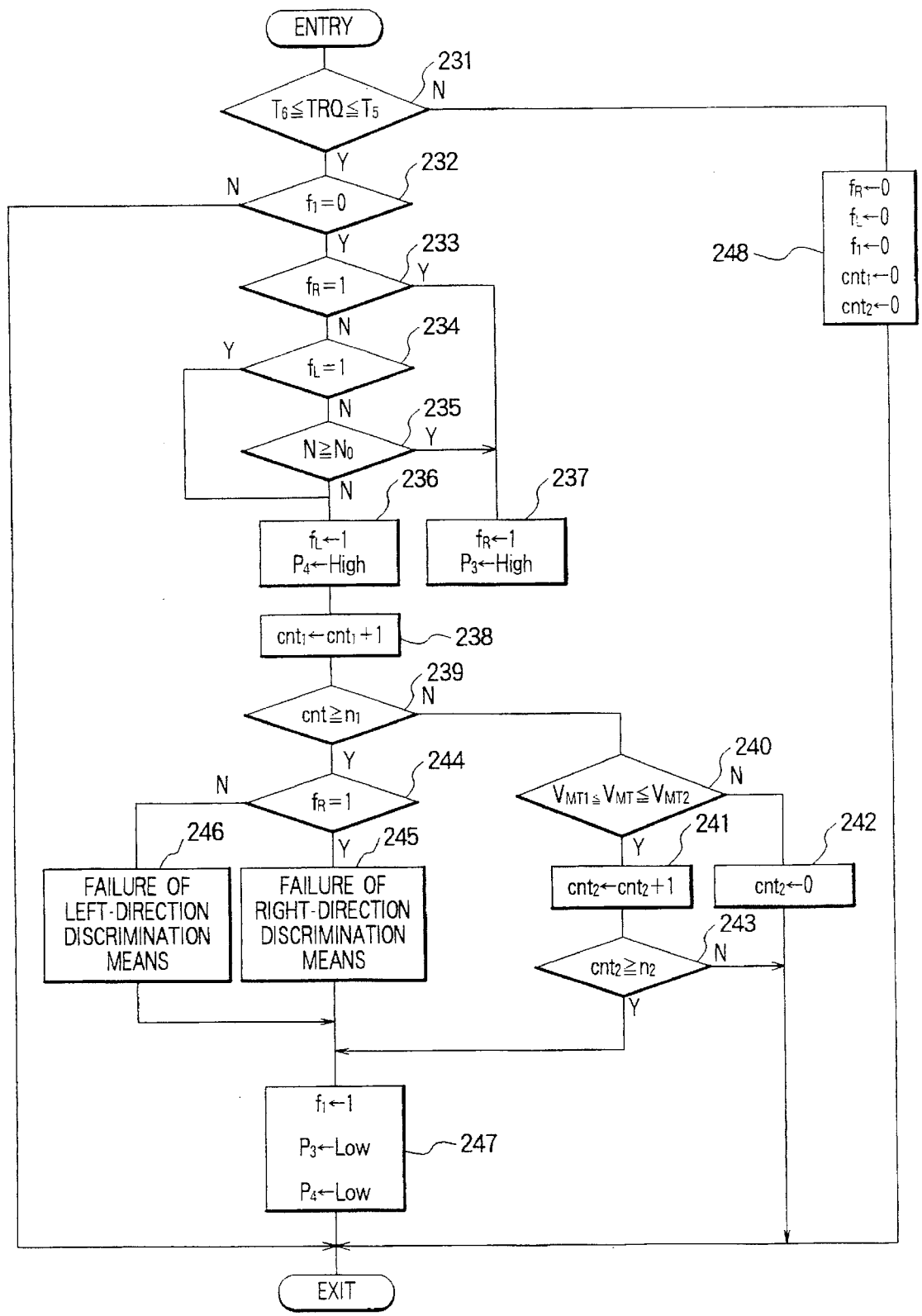
FIG. 16 is a flow chart for explaining the operations of the sixth embodiment.

Embodiment 6:

In the case of the above embodiment 5, it is judged that the motor driving direction discrimination means 11 was broken by actually driving the motor 1, based on the motor current generated by driving the motor at that time. However, it is also possible to judge that the motor driving direction discrimination means 11 is broken in accordance with the value of a motor terminal voltage until the motor mechanically stops after driving it. Operations of this embodiment are described below by using the electric power steering controller whose structure is shown in FIG. 8 as an example and referring to the flow chart in FIG. 16.

Failure detection of the motor driving direction discrimination means 11 is performed when the output signal TRQ obtained from the steering torque detection means 7 shows the neutral point (step 231) but flags and counters are cleared in other cases (step 248). When the condition of step 231 is effected, the program advances to step 235 because the failure detection termination flag f1, a failure detection flag fR for the right-direction discrimination means 9, and a failure detection flag fL for the left-direction discrimination means 10 are already cleared. When a value N obtained from the motor speed detection means 30 shows left rotation, the flag fL is set to 1 and P4 is made high (step 236).

When the value N obtained from the motor speed detection means 30 shows right rotation, the flag fR is set to 1 and an output signal of the port P3 is set to the high level (step 237). In this case, because either of the flags fR and fL are set to 1, a failure detecting the direction of the motor driving direction discrimination means 11 is subsequently determined in step 233 or 234 independently of the motor speed N.

Then, the counter $cnt_1$ is counted up (step 238), the motor terminal voltage VMT is detected until the counted value of the counter $cnt_1$ reaches the set value $n_1$, and it is checked if the detected value VMT is present between the thresholds VMT1 and VMT2 (step 240). When the condition of step 240 is effected, the counter $cnt_2$ is counted up (step 241). When the counted value of the counter $cnt_2$ reaches the set value $n_2$ (step 243), it is judged that the motor driving direction discrimination means 11 is normal, and the flag f1 is set to 1 and output signals of the ports P3 and P4 are set to the low level (step 247).

Unless the motor terminal voltage VMT meets the condition of step 240, the counter $cnt_2$ is cleared (step 242). When the counted value of the counter $cnt_1$ reaches the set value $n_1$ before the counted value of the counter $cnt_2$ reaches the set value $n_2$, for example, when the flag fR is set to 1, it is judged that the right-direction discrimination means 10 is broken. However, when the flag fR is set to 0, it is judged that the left-direction discrimination means 10 is broken (steps 244, 245, and 246). Thereafter, the failure detection termination flag f1 is set to 1 and P3 and P4 are made low similarly to the case of normal judgment (step 247).

Hereafter, because the failure detection termination flag f1 is checked in step 232, failure detection of the motor driving direction discrimination means 11 is not performed unless the value of the output signal TRQ of steering torque is less than T6 or exceeds T5, each flag and counter are cleared in step 248, and then the value returns to the neutral point. When it is judged in step 246 or 245 that the means 11 is broken, output signals of the ports P1, P2, P3, and P4 are set to the low level to stop the motor 1 until the system stops in step 405 in the main program shown in FIG. 29.

FIGS. 17a to 17f show operational waveforms when failure detection of the left-direction discrimination means 10 is performed in accordance with the above method. In FIGS. 17a to 17f, FIG. 17a is a torque signal obtained from the steering torque detection means 7, showing the state in which the steering torque shifts to the left of the threshold $T_1$ and converges to the neutral point.

FIG. 17b is a motor speed signal obtained from the motor speed detection means 30, showing the state in which the motor speed approaches 0 as the steering torque converges to the neutral point. FIG. 17c is an output signal of the port P3, in which a right-direction driving signal is set to the low level when the steering torque reaches the neutral point. FIG. 17d is an output signal of the port P4, which is set to the high level for the period of $n_1$ in order to judge that the left-direction discrimination means 10 is broken when the steering torque reaches the neutral point.

FIG. 17e is a motor terminal voltage when the motor driving direction discrimination means 11 is normal, in which the motor terminal voltage VTM0 at the contact P becomes equal to a voltage set by the voltage applying means 24 when the first to fourth transistors 2a to 2c are turned off.

FIG. 17f is a motor terminal voltage when the left-direction discrimination means 10 is broken, in which the motor terminal voltage at the point P lowers to 0 V when a low-level left-direction driving signal is input to the second AND circuit 13 from the port P4 for the period of $n_1$ if the left-direction discrimination means 10 is broken as shown in FIG. 17d.

That is, when the first to fourth transistors 2a to 2d are all turned off and the motor 1 rotates counterclockwise due to its inertia, the electromotive force of the motor 1 is generated in the direction of Va in FIG. 8. However, while the motor 1 rotates at a high speed and the electromotive force exceeds a power supply voltage VB, current flows to the power supply VB through a commutating diode connected inversely parallel to the fourth transistor 2d, the motor 1, and a commutating diode connected inversely parallel to the second transistor 2b. Therefore, the motor terminal voltage (point P) becomes almost equal to 0 V as shown in FIG. 17(e).

However, when the rotational speed of the motor 1 decreases and the electromotive force becomes smaller than the power supply voltage VB, no current flows. When the left-direction discrimination means 10 is normal and the fourth transistor 2d is turned off, the motor terminal voltage approaches the voltage VMT0 determined by the resistances 21 and 23 and the diode 22. Thereafter, when the motor 1 stops, the motor terminal voltage becomes equal to VMT0.

However, when the left-direction discrimination means 10 is broken, a left-driving enabling signal is output from the second AND circuit 13 to the transistor drive circuit 4d, and the fourth transistor 2d is turned on, the motor terminal voltage is kept at 0 V even if the motor 1 stops. Therefore, it is detected that the left-direction discrimination means 10 is broken.

In the case of clockwise rotation, an electromotive force is generated in the direction of Vb. Therefore, current flows to the power supply VB through a commutating diode connected in inversely parallel with the third transistor 2c, the motor 1, and a commutating diode connected in inversely parallel with the first transistor 2a. Then, the voltage of the point P becomes almost equal to VB. However, because the voltage is clipped by the diode 28, a detected motor terminal voltage becomes almost equal to Vcc. If the right-direction discrimination means 9 is normal and the third transistor 2c is turned off, the motor terminal voltage becomes equal to VMT0 when the motor 1 stops. However, when the right-direction discrimination means 9 is broken and the third transistor 2c is turned on, the motor terminal voltage becomes almost equal to 0 V and it is judged that the right-direction discrimination means 9 is broken.

In the case of failure detection of the motor driving direction discrimination means 11 by this embodiment, the set value $n_1$ is set to a value larger than the sum of the maximum time from the time when the first to fourth transistors 2a to 2d are all turned off to the time when the motor 1 stops and the set value $n_2$. As a result, even if the rotational speed of the motor 1 is not detected, failure detection can be performed by obtaining the rotational direction of the motor 1 when the steering torque become neutral.

Therefore, when detecting the rotational direction of the motor 1 with an observer or the like using motor terminal voltage or the like, it is possible to realize failure detection means inexpensively. Moreover, even if the motor driving direction discrimination means 11 is broken and a transistor is turned on during failure detection, it is possible to perform failure detection without imparting a mechanical shock to the steering wheel because a motor current is not influenced. Furthermore, this embodiment is effective for the structure shown in FIG. 12.

Figure 18:
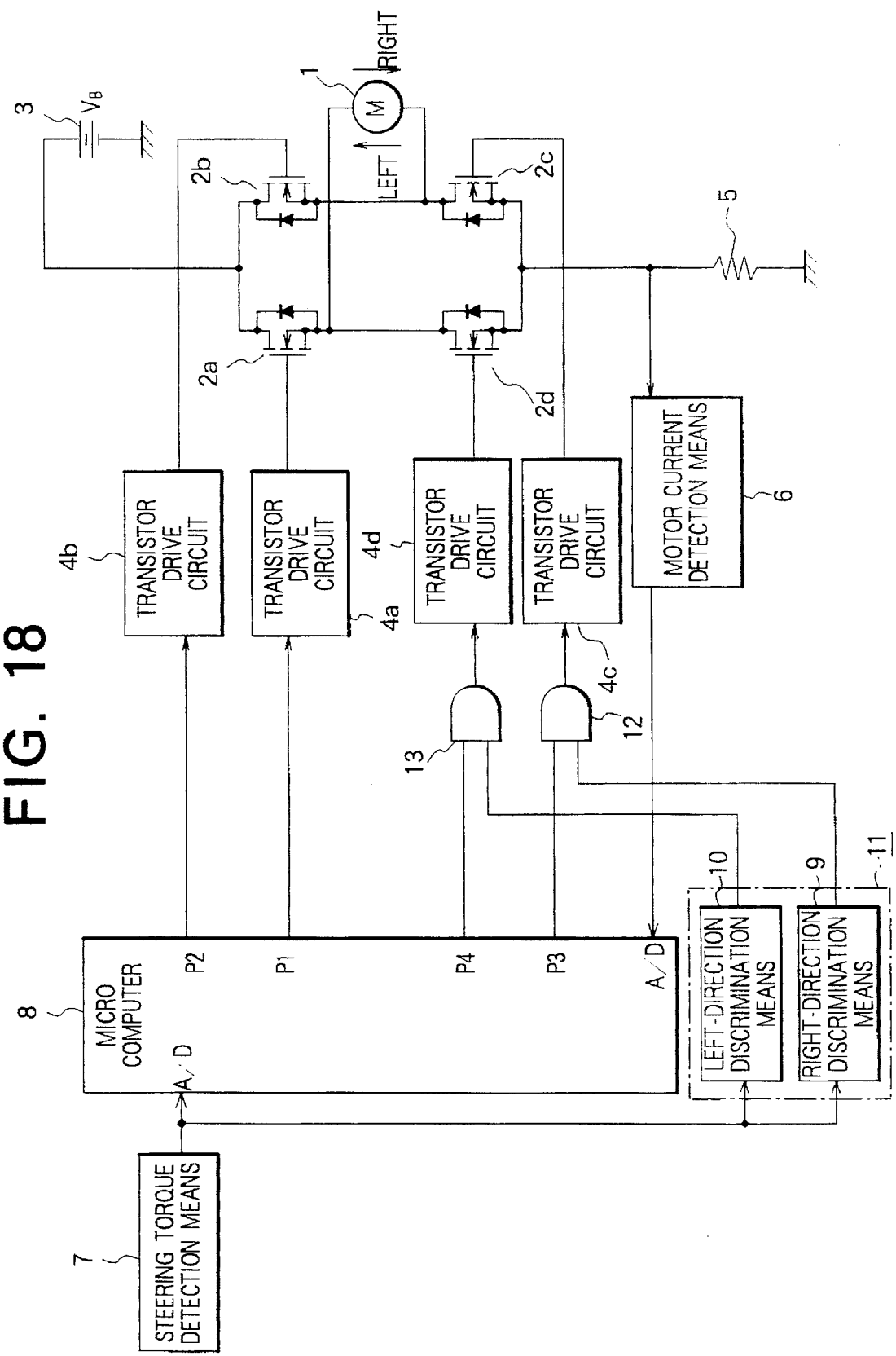
FIG. 18 is a block diagram of the electric power steering controller of the seventh embodiment of the present invention.

Embodiment 7:

In the case of the above embodiment, a failure of the motor driving direction discrimination means 11 is detected when the steering torque is neutral and driving of the motor 1 is inhibited. However, it is also possible to detect a failure by driving the motor 1 and controlling the steering torque. FIG. 18 is a block diagram of an electric power steering controller preferably used to execute this embodiment.

Figure 19:
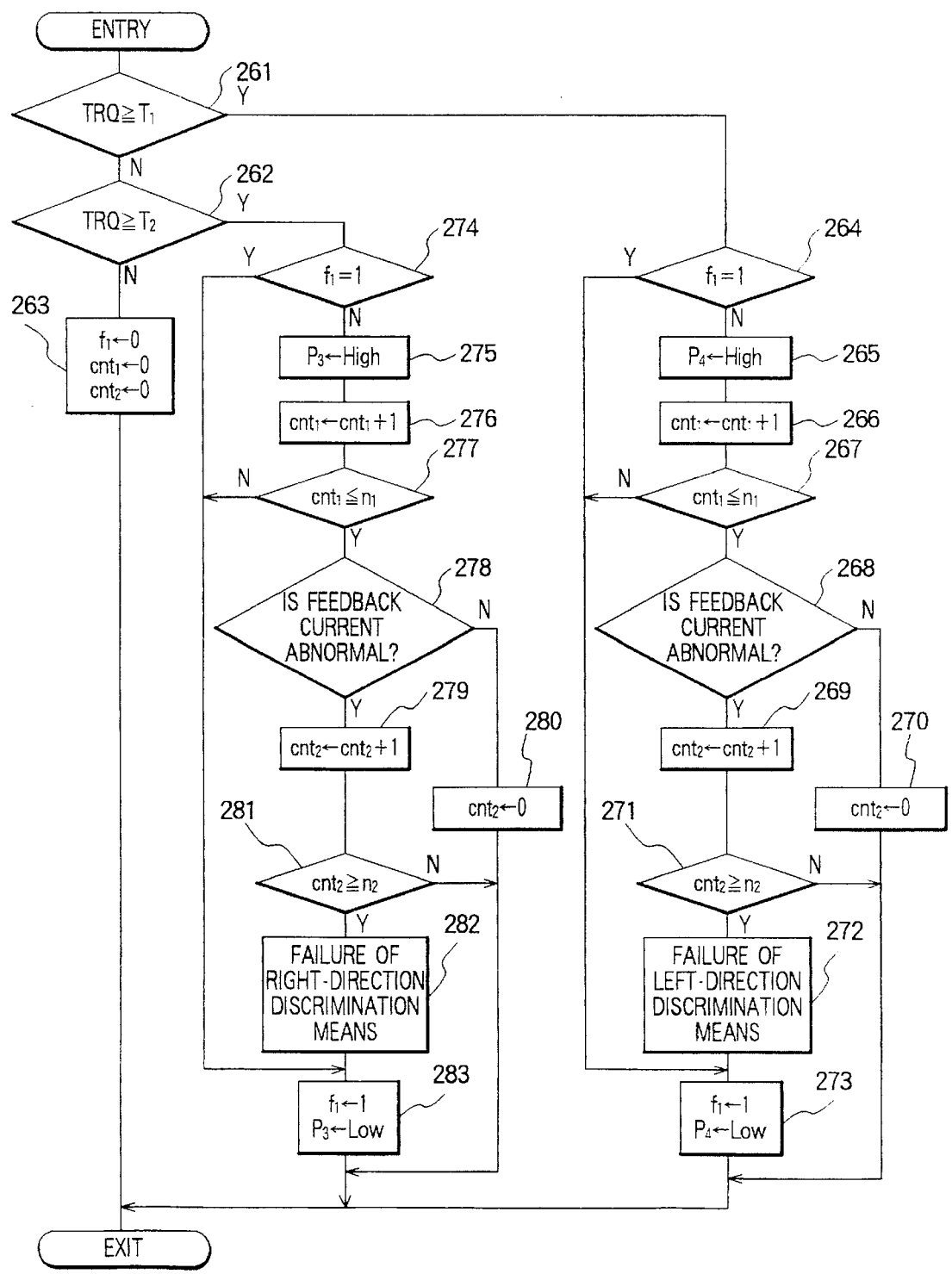
FIG. 19 is a flow chart for explaining the operations of this embodiment.

Operations of this embodiment are described below by referring to the flow chart in FIG. 19, and FIGS. 2, 3, and 4. In FIG. 19, description is separately made for a case of driving the motor 1 rightward, a case of driving the motor 1 leftward, and a case of not driving the motor I in accordance with the output signal value TRQ of the steering torque detection means 7 (steps 261 and 262). When not driving the motor 1, the failure detection termination flag f1 is set to 0 and counted values of the counters $cnt_1$ and $cnt_2$ are set to 0 (step 263).

When driving the motor 1 rightward, the procedure is branched at step 261, and P4 is made high (step 265) and the counter $cnt_1$ is counted up (step 266) while the failure detection termination flag f1 is kept at 0 (step 264). Until the counter $cnt_1$ reaches the set value $n_1$ (step 267), it is checked if feedback current is abnormal which is returned to the microcomputer 8 through the motor current detection means 6 (step 268). If so, the counter $cnt_2$ is counted up (step 269). If not, a counted value of the counter $cnt_2$ is set to 0 (step 270).

When the counted value of the counter $cnt_2$ reaches the set value $n_2$, it is judged that the left-direction discrimination means 10 is broken (steps 271 and 272) and the flag f1 is set to 1 and the signal level of the port P4 is made low (step 273). When a counted value of $cnt_1$ reaches the set value $n_1$ before it is decided that the left-direction discrimination means 10 is broken (step 267), it is judged that the left-direction discrimination means 10 is normal and failure detection terminates. When the failure detection terminates, the failure detection termination flag f1 is set to 1 in step 273. Therefore, failure detection is not thereafter performed by step 264 during rightward driving.

When driving the motor 1 leftward, the procedure is branched at step 262, and the signal level of the port P3 is made high (step 275) and the counter $cnt_1$ is counted up (step 276) while the failure detection termination flag f1 is kept at 0 (step 274). Until the counted value of the counter $cnt_1$ reaches the set value $n_1$ (step 277), it is checked if abnormal feedback current flows (step 278). If so, the counter $cnt_2$ is counted up (step 279). If not, the counted value of the counter $cnt_2$ is set to 0 (step 280).

When the counted value of the counter $cnt_2$ reaches the set value $n_2$, it is judged that the right-direction discrimination means 9 is broken (steps 281 and 282), the flag f1 is set to 1 and the signal level of the port P3 is made low (step 283). When the counted value of $cnt_1$ reaches the set value $n_1$ before it is decided that the right-direction discrimination means 9 is broken (step 277), it is judged that the right-direction discrimination means 9 is normal and failure detection terminates. When the failure detection terminates, the failure detection termination flag f1 is set to 1 in step 283. Therefore, failure detection is not thereafter performed by step 274 during leftward driving.

Figure 20:
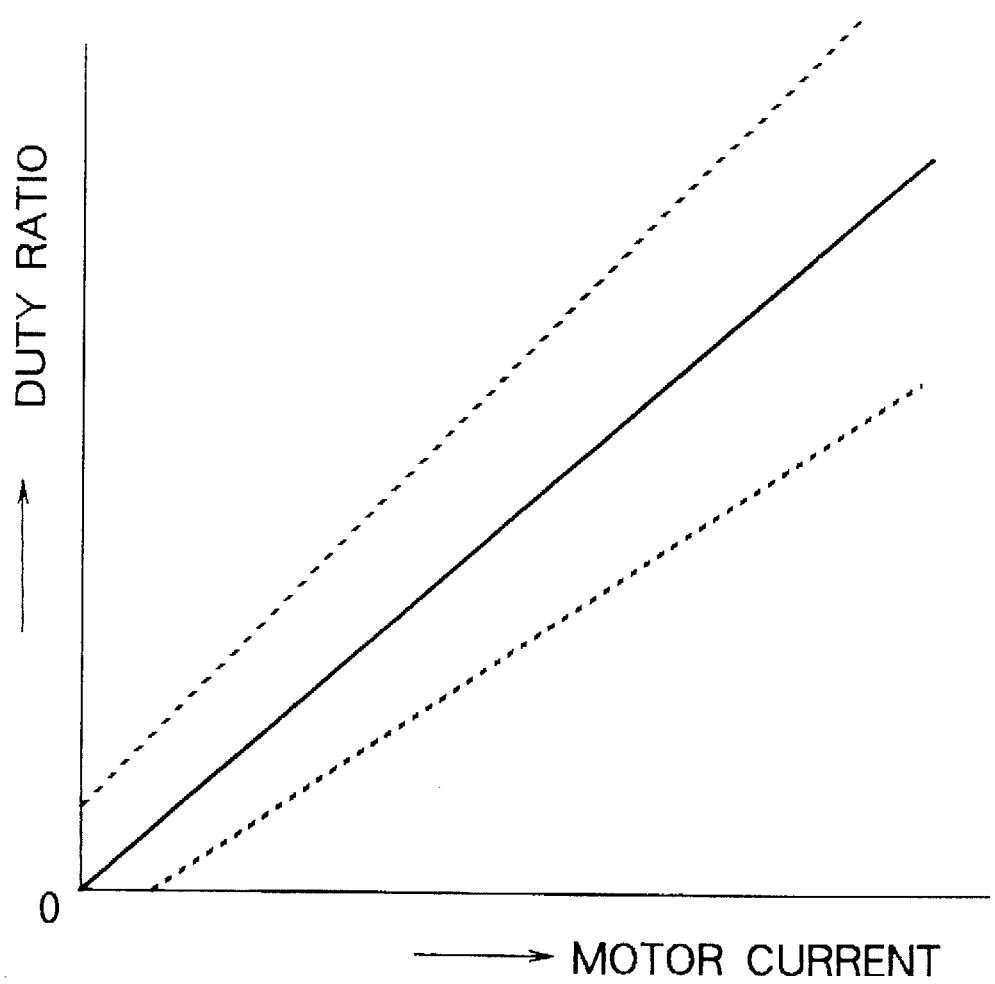
FIG. 20 is an illustration showing the relation between motor current and PWM duty ratio.

As for abnormal feedback current, the relation shown in FIG. 20 is effected between motor current and PWM duty ratio when power supply voltage and load are in a normal range. Therefore, when a duty ratio to motor current goes out of the range shown by broken lines, it is judged that feedback current is abnormal. In the case of this embodiment, the fourth transistor 2d is turned on if an output signal of the port P4 is set to the high level while the left-direction discrimination means 10 of the motor driving direction discrimination means 11 is broken and a left-direction discriminating signal is output to the AND circuit 13 when the motor 1 is driven rightward.

In this case, the first transistor 2a connected in series with the fourth transistor 2d is turned on. Therefore, because feed-through current flows between the power supply VB and the ground through the first transistor 2a and the fourth transistor 2d, the duty ratio to motor current greatly decreases and the above abnormal feedback current is detected. When it is judged that the left-direction discrimination means 10 or the right-direction discrimination means 9 is broken in step 272 or 282, signals of the ports P1, P2, P3, and P4 are set to the low level in step 405 in the main program shown in FIG. 29 to stop the motor 1 until the system stops.

Moreover, in the case of this embodiment, failure detection is performed for a time determined by the set value $n_1$ from the time when the output signal value TRQ of the steering torque becomes equal to or higher than the first threshold $T_1$ or equal to or less than the second threshold $T_2$. However, it is also possible to perform failure detection of the left-direction discrimination means 10 whenever the steering torque TRQ is equal to or higher than the first threshold $T_1$ and failure detection of the right-direction discrimination means 9 whenever the steering torque TRQ is equal to or lower than the second threshold $T_2$. As described above, this embodiment makes it possible to perform failure detection of the motor driving direction discrimination means 11 even if a threshold is set so that the motor 1 may be driven.

Figure 21:
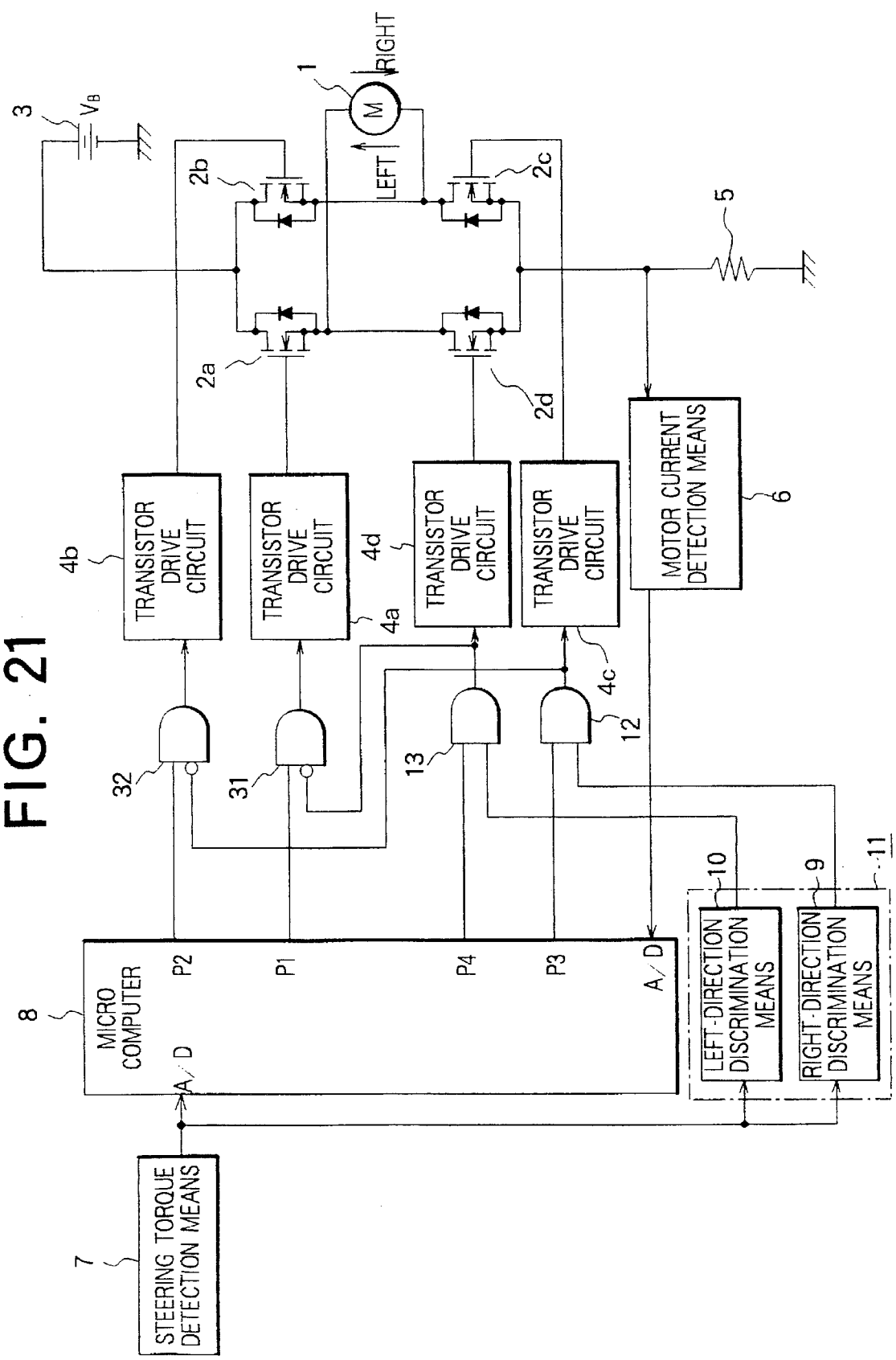
FIG. 21 is a block diagram of the electric power steering controller of the eighth embodiment of the present invention.

Embodiment 8:

In the above embodiments, a failure of the motor driving direction discrimination means 11 is detected by flowing feed-through current. However, it is also possible to perform failure detection in accordance with a change of feedback current without flowing feed-through current. FIG. 21 shows a block diagram of an electric power steering controller preferably used to execute this embodiment. In FIG. 21, symbols similar to those in FIG. 18 represent portions similar or equivalent to those in FIG. 18. When a high-level left-driving enabling signal is input to a negative logic input terminal from the second AND circuit 13, an AND circuit 31 disables a right-direction driving signal input to the other input terminal from P1 of the microcomputer 8 and turns off the first transistor 2a. When a high-level right-driving enabling signal is input to a negative logic input terminal from the first AND circuit 12, an AND circuit 32 disables a left-direction driving signal input to the other input terminal from P2 of the microcomputer 8 and turns off the second transistor 2b.

As for abnormal feedback current, the relation shown in FIG. 20 is effected between motor current and PWM duty ratio when power supply voltage and load are in a normal range. Therefore, when duty ratio to motor current goes out of the range shown by the broken lines, it is judged that feedback current is abnormal. In this embodiment, a high-level left-driving enabling signal is output and the fourth transistor 2d is turned on if P4 is made high while the left-direction discrimination means 10 of the motor driving direction discrimination means 11 is broken and a left-direction discriminating signal is output to the second AND circuit 13 when the motor 1 is driven rightward.

However, because the high-level left-driving enabling signal is also output to the negative logic input terminal of the AND circuit 31, a right-direction driving signal input to the positive logic terminal of the AND circuit 31 from the port P1 is disabled. Therefore, a driving signal output from the AND circuit 31 is set to the low level to turn off the first transistor 2a.

Even if failure detection is performed when the motor driving direction discrimination means 11 is broken, no feed-through current flows from the first transistor 2a to the fourth transistor 2d. Therefore, the duty ratio of PWM output to motor current greatly increases and abnormal feedback current can be detected. When it is judged that the motor driving direction discrimination means 11 is broken, the ports P1, P2, P3, and P4 are set to the low level in step 405 in the main program shown in FIG. 29 to stop the motor 1 until the system stops. As a result, because the failure detection can be performed without flowing feed-through current, it is possible to decrease the load of the first transistor 2a to the fourth transistor 2d and to avoid breakdown.

Embodiment 9:

In the case of the above embodiments, the presence or absence of a direction discriminating signal output from the motor driving direction discrimination means 11 is univocally determined in accordance with a detection result of the steering torque detection means 7. Therefore, to eliminate a right-direction discriminating signal and a left-direction discriminating signal, it is necessary to make the steering torque neutral by operating the steering wheel. However, it is also possible to perform failure detection of the motor driving direction discrimination means 11 independently of an output of the steering torque detection means 7.

Figure 22:
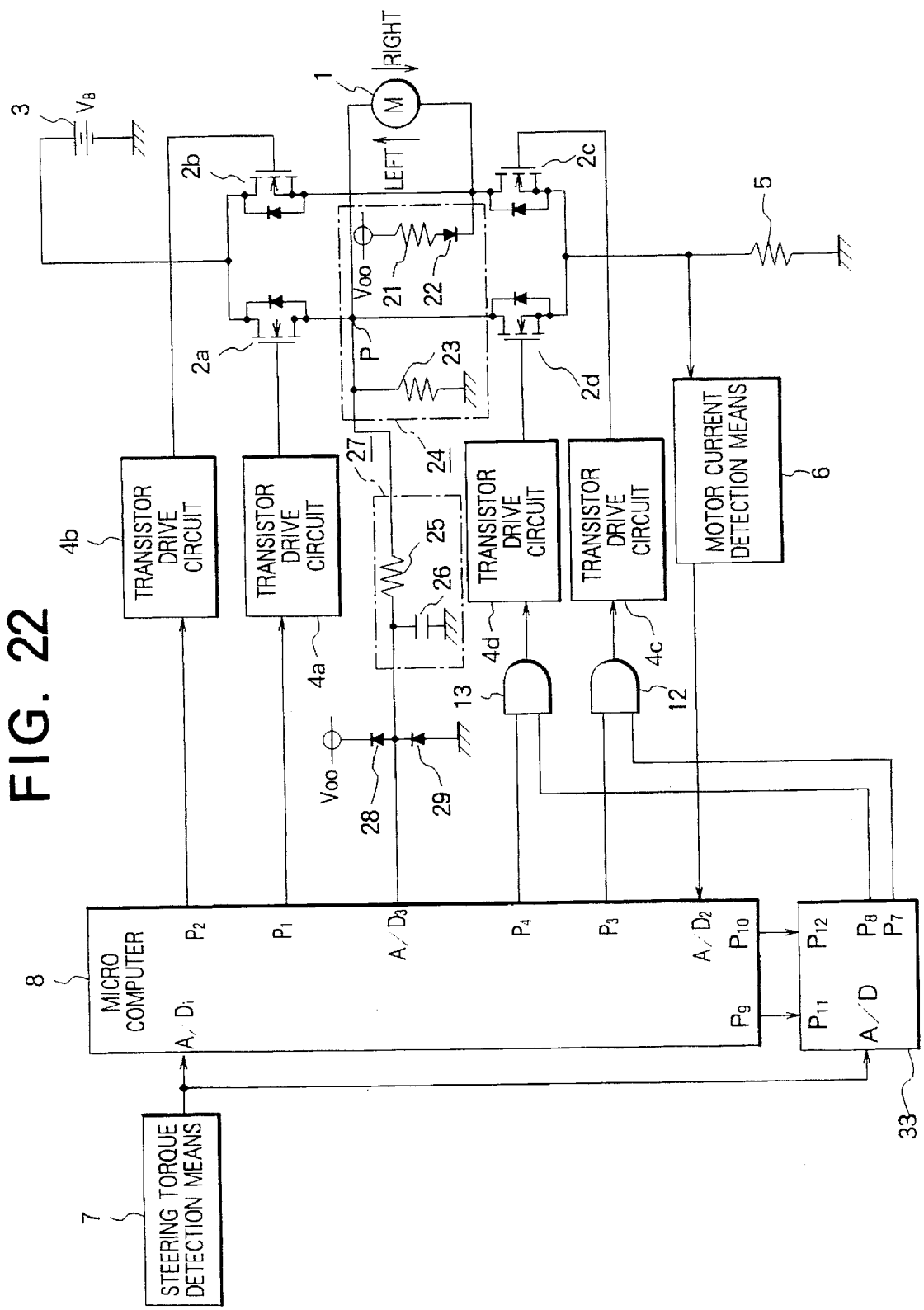
FIG. 22 is a block diagram of the electric power steering controller of the ninth embodiment of the present invention.

FIG. 22 shows a block diagram of an electric power steering controller preferably used to execute this embodiment. In FIG. 22, symbols similar to those in FIG. 8 represent portions similar or equivalent to those in FIG. 8. A microcomputer 33 for judging a motor driving direction outputs a right-direction discriminating signal from the port P7 and a left-direction discriminating signal from the port P8 to the first AND circuit 12 and the second AND circuit 13 in accordance with a detection result of the steering torque detection means 7. When a right-driving inhibiting signal is input from the port P9 of the microcomputer 8 to the port P11 of the microcomputer 33, it is forcibly inhibited from outputting a right-direction discriminating signal independent of a detection result of the steering torque detection means 7. Moreover, when a left-driving inhibiting signal is input from the port P10 of the microcomputer 8 to the port P12 of the microcomputer 33, it is forcibly inhibited from outputting a left-direction discriminating signal independent of a detection result of the steering torque detection means 7.

Figure 23:
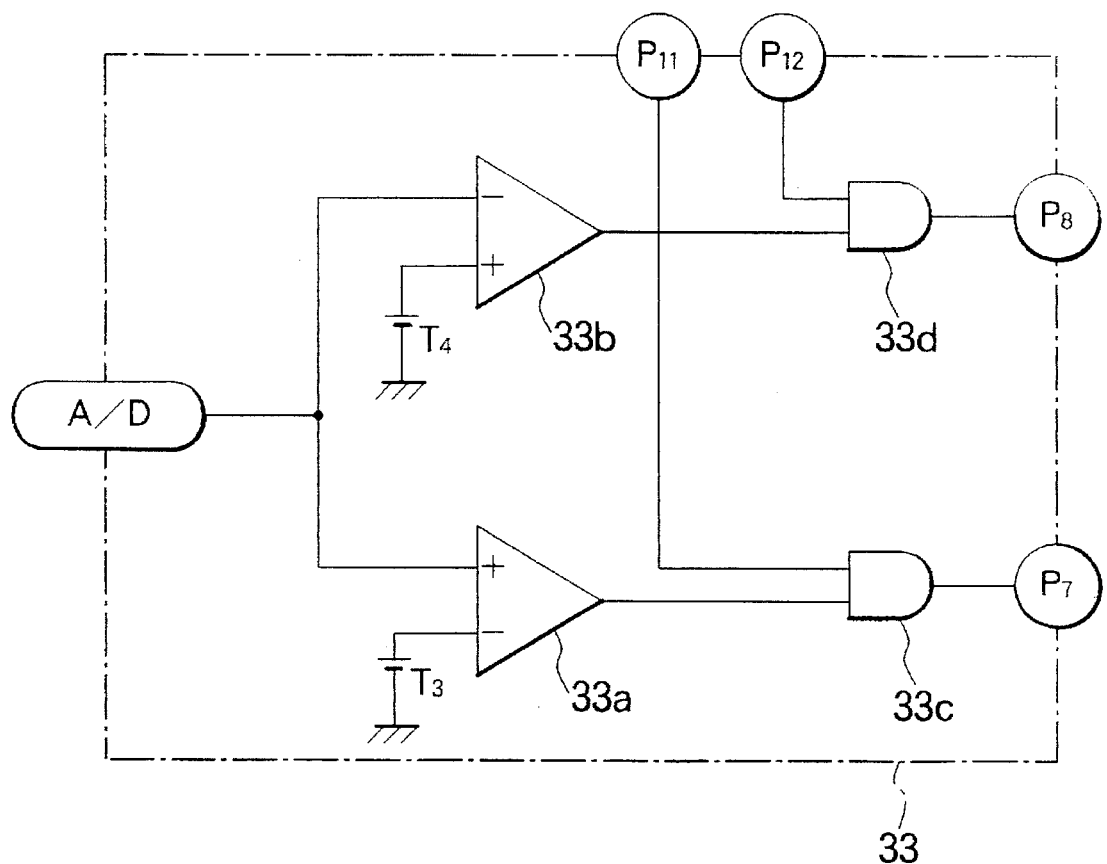
FIG. 23 is a block diagram for explaining the functions of the computer 33 of this embodiment.

FIG. 23 is an illustration showing a processing function of the microcomputer 33 in view of hardware. In FIG. 23, a voltage at a level equivalent to the third threshold $T_3$ is applied to the negative input terminal of a comparator 33a. Moreover, the output signal TRQ of the steering torque detection means 7 is input to the positive input terminal of the comparator 33a through an A/D. As a result, when the output signal TRQ exceeds the third threshold $T_3$, the comparator 33a outputs a high-level comparing signal.

A voltage at a level equivalent to the fourth threshold $T_4$ is applied to the positive input terminal of a comparator 33b. Moreover, the output signal TRQ of the steering torque detection means 7 is input to the negative input terminal of the comparator 33b through the A/D. When the output signal TRQ exceeds the fourth threshold $T_4$, the comparator 33b outputs a high-level comparing signal.

The comparing signal is input to one input terminal of an AND circuit 33c from the comparator 33a and a low-level right-driving inhibiting signal is input to the other input terminal of the circuit 33c from the microcomputer 8 through the port P11. Therefore, when the right-driving inhibiting signal is input, a right-direction discriminating signal output from the port P7 is forcibly set to the low level independent of the level of the comparing signal output from the comparator 33a.

The comparing signal from the comparator 33b is input to one input terminal of an AND circuit 33d and a low-level left-driving inhibiting signal is input to the other input terminal of the circuit 33d from the microcomputer 8 through the port P12. Therefore, when the left-driving inhibiting signal is input, a left-direction discriminating signal output from the port P8 is forcibly set to the low level independent of the level of the comparing signal output from the comparator 33b.

Figure 24C:
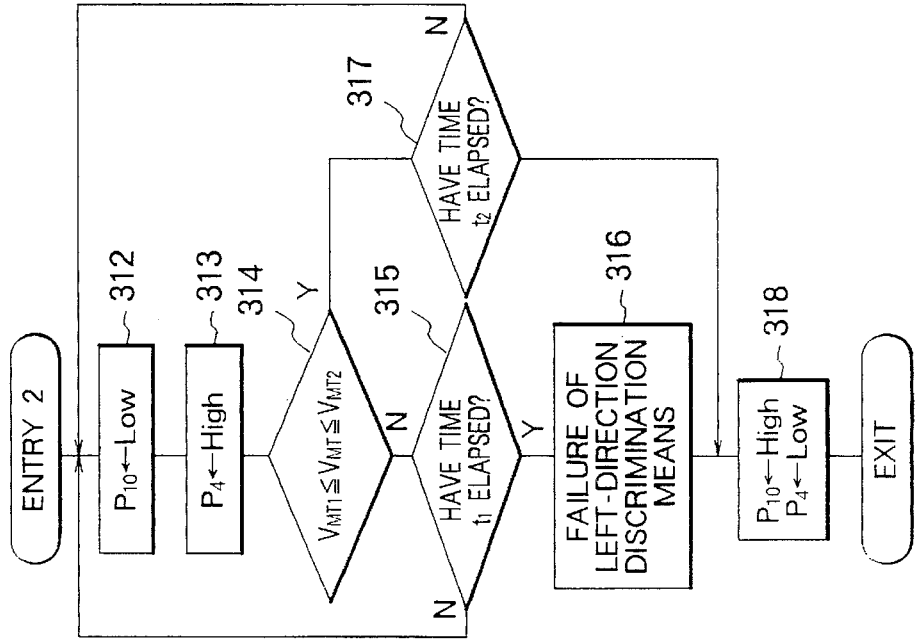
FIGS. 24a to 24c is a series of flow charts for explaining the operations of this embodiment.

Next, a processing procedure is described below by referring to the flow charts in FIGS. 24a to 24c, and FIGS.

2, 3, and 4. In FIGS. 24a to 24c, FIG. 24a is a flow chart of the main program, FIG. 24b is a flow chart of failure detection of a right-direction discriminating function, and FIG. 24c is a flow chart of failure detection of a left-direction discriminating function. In FIG. 24a, the system is started and then initialization is performed (step 301), thereafter failure detection of the right-direction discriminating function is performed (step 302), then failure detection of the left-direction discriminating function (step 303), and thereafter normal control is started (step 304). At the time of initialization (step 301), the microcomputer 8 makes the output signal levels of the ports P1 and P2 low and turns off the first transistor 2a and the second transistor 2b.

Figure 24B:
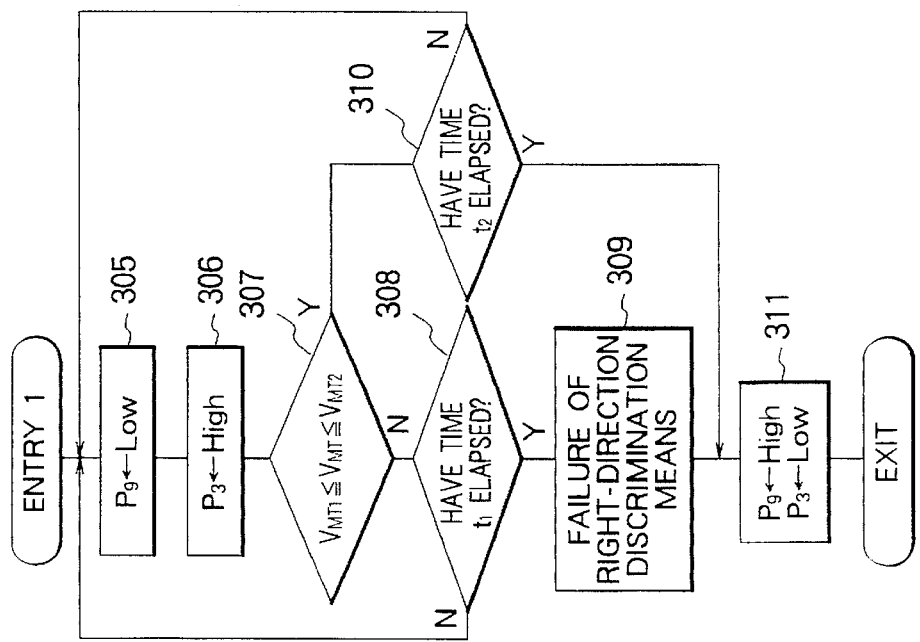
Figure 24A:
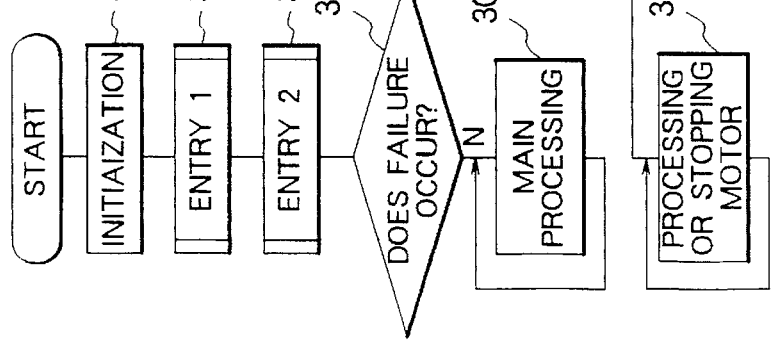

In FIG. 24b, failure detection of the right-direction discriminating function is performed by setting the port P9 to the low level and forcibly sets an output of the port 7 of the microcomputer 33 to the low level (step 305). Then, the signal level of port P3 is set to high (step 306). When a state in which the then motor terminal voltage VMT is lower than the threshold VMT1 or exceeds the threshold VMT2 (step 307) continues for the set time $t_1$ (step 308), it is judged that the right-direction discriminating function is broken (step 307). Then, the output signal level of the port P9 is made high and the output signal level of the port P4 is made low (step 311) to terminate the failure detection. When a state in which the motor terminal voltage VMT is equal to or higher than the threshold VMT1 and equal to or lower than the threshold VMT2 continues for the set time $t_2$ (step 310) in step 307, it is judged that the right-direction discriminating function is normal and the failure detection of the right-direction discriminating function terminates (step 311).

After the failure detection of the right-direction discriminating function, failure detection of the left-direction discriminating function is performed. In FIG. 24c, the output signal level of the port P10 is made low and the output signal level of the port P8 of the microcomputer 33 is forcibly made low (step 312). Then, the output signal level of the port P4 is made high (step 313). When a state in which the then motor terminal voltage VMT is lower than the threshold VMT1 or exceeds the threshold VMT2 (step 314) continues for the set time $t_1$ (step 315), it is judged that the left-direction discriminating function is broken (step 316). Then, the output signal level of the port P10 is made high and the output signal level of the port P4 is made low (step 318) to terminate the failure detection. When a state in which the motor terminal voltage VMT is equal to or higher than the threshold VMT1 and equal to or lower than the threshold VMT2 continues for the set time $t_2$ in step 314 (step 317), it is judged that the left-direction discriminating function is normal and the failure detection of the left-direction discriminating function terminates (step 318). When it is judged in step 309 or 316 that the left-direction discriminating function is broken, output signal levels of the ports P1, P2, P3, and P4 are made low to stop the motor 1 until the system stops in step 405 in the main program shown in FIG. 24a (steps 320 and 321).

According to the above structure, it is possible to detect a failure of the motor driving direction discriminating function independent of an output of the steering torque detection means 7. Moreover, failure detection can be performed even if the threshold of the motor driving direction discriminating function is neutral and set so that driving of the motor 1 is inhibited. Furthermore, failure detection can be performed without any loss in safety because the microcomputer 33 is programmed so that only driving of the motor 1 can be inhibited in accordance with a signal sent from the microcomputer 8.

Figure 25:
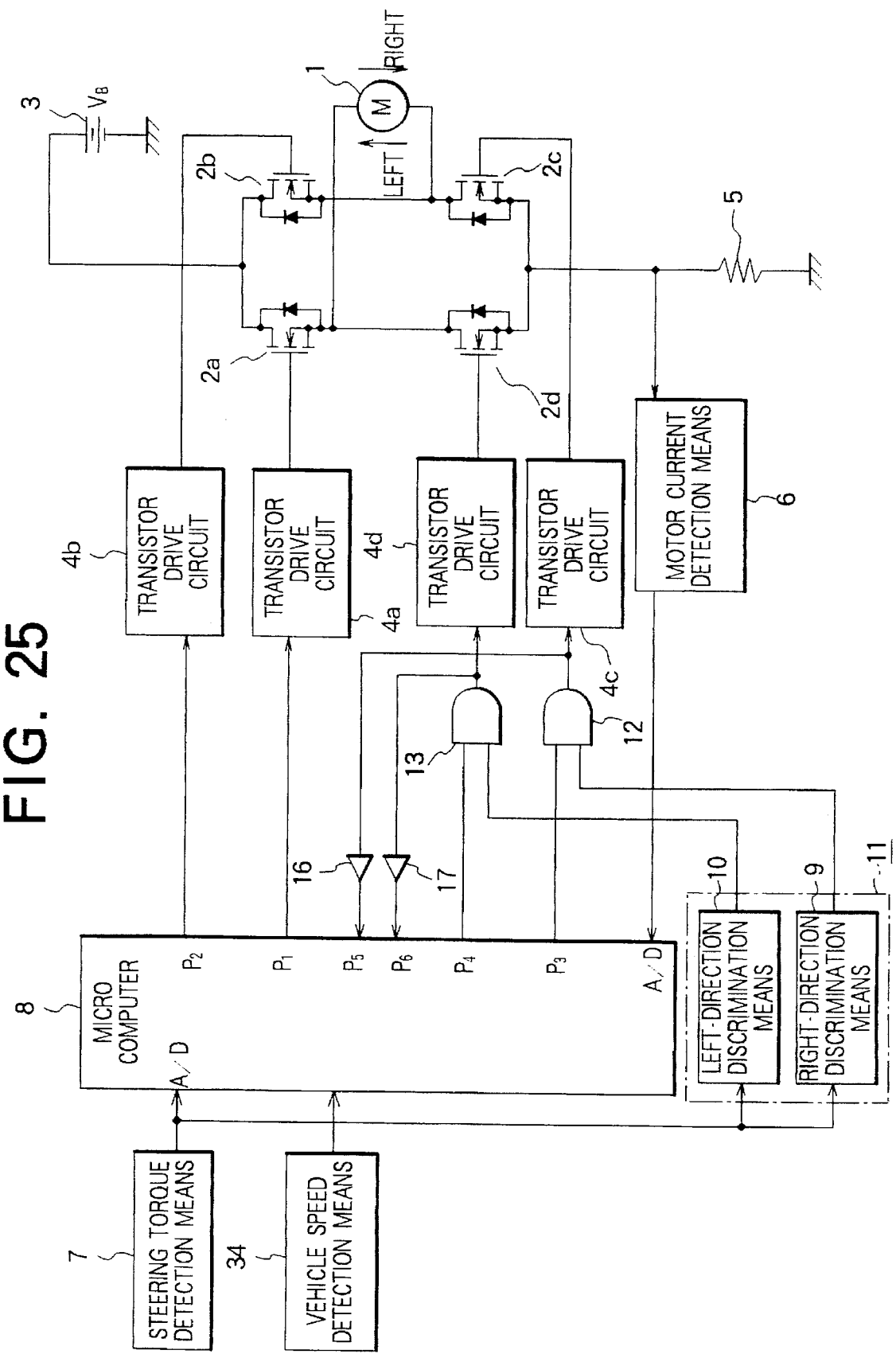
FIG. 25 is a block diagram of the electric power steering controller of the tenth embodiment of the present invention.
Figure 26:
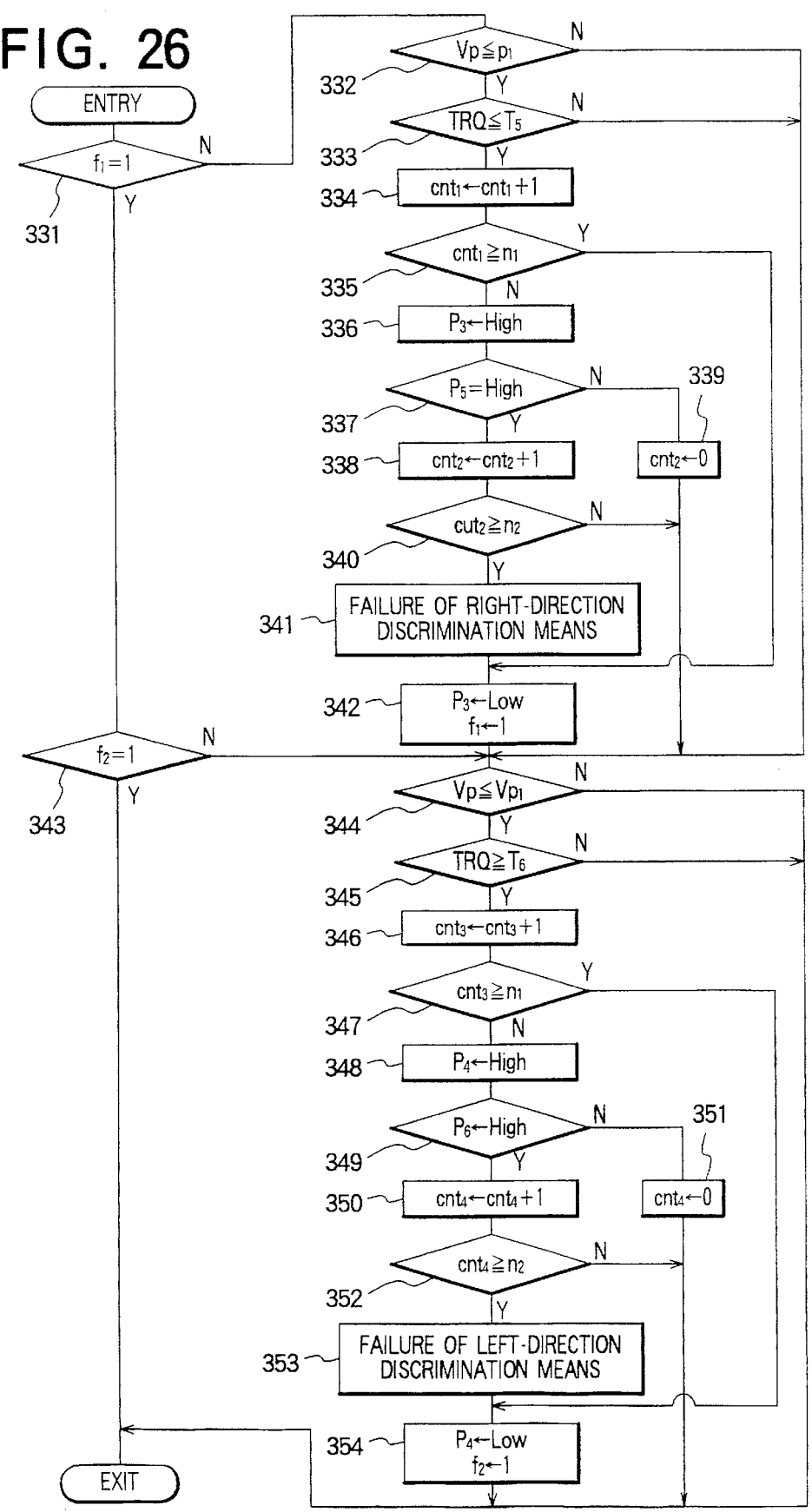
FIG. 26 is a flow chart for explaining the operations of this embodiment.

Embodiment 10:

When the motor driving direction discrimination means 11 is broken, it is also possible to perform failure discrimination so that failure detection can be performed only for the vehicle speed 0 in order to avoid the steering wheel rotating. FIG. 25 shows a block diagram of an electric power steering controller preferably used to execute this embodiment. In FIG. 25, symbols similar to those in FIG. 1 represent portions similar or equivalent to that in FIG. 1. In FIG. 25, symbol 34 represents a vehicle speed detection means for detecting a vehicle speed.

Next, operation of this embodiment will be described below by referring to the flow chart in FIG. 26, and FIGS. 2, 3, and 4. First, when the failure detection termination flag f1 of the right-direction discrimination means 9 is set to 0 (step 331), a value VP obtained from the vehicle speed detection means 34 is equal to or less than a predetermined value VP1 in which it is judged that a vehicle is stopped (step 332) and the value of the output signal TRQ obtained from the steering torque detection means 7 is equal to or lower than the fifth threshold $T_5$ (step 333), the counter $cnt_1$ is counted up (step 334). In this case, unless a counted value of the counter $cnt_1$ reaches the set value $n_1$ (step 335), a high-level signal is output from the port P3 (step 336), the output of the first AND circuit 12 at that time is monitored, and the counter $cnt_2$ is counted up if the output is at the high level but the counter $cnt_2$ is set to 0 if the output is at the low level (steps 337, 338, and 339).

When the counted value of the counter $cnt_1$ reaches the set value $n_1$ before a counted value of the counter $cnt_2$ reaches the set value $n_2$ (step 335), it is judged that the right-direction discrimination means 9 is normal, a low-level signal is output from the port P3, the failure detection termination flag f1 is set to 1 (step 342), and the failure detection of the right-direction discrimination means 9 terminates. However, if the counter $cnt_2$ reaches the set value $n_2$ (step 340) before the counter $cnt_1$ reaches the set value $n_1$ (step 335), it is judged that the right-direction discrimination means 9 is broken (step 341). Then, a low-level signal is output from the port P3, the failure detection termination flag f1 is set to 1 (step 342), and the failure detection of the right-direction discrimination means 9 terminates.

In the case of the failure detection of left-direction discrimination means, the counter $cnt_3$ is counted up (step 346) when it is judged that the vehicle is stopped (step 344) and the value of the output signal TRQ of the steering torque detection means is equal to or higher than the sixth threshold $T_6$ (step 345). Unless a counted value of the counter $cnt_3$ reaches the set value $n_1$ (step 347), a high-level signal is output from the port P4 (step 348), the output of the second AND circuit 13 at that time is monitored, and the counter $cnt_4$ is counted up if the output is at the high level. If the output of the second AND circuit is at the low level, the counter $cnt_4$ is set to 0 (steps 349, 350, and 351).

When the counted value of the counter $cnt_3$ reaches the set value $n_1$ before the counted value of the counter $cnt_4$ reaches the set value $n_2$ (step 347), it is judged that the left-direction discrimination means 10 is normal, a low-level signal is output from P4, the failure detection termination flag f2 is set to 1 (step 354), and the failure detection of the left-direction discrimination means 10 terminates. However, when the counter $cnt_4$ reaches the set value $n_2$ (step 352) before the counted value of the counter $cnt_3$ reaches the set value $n_1$ (step 347), it is judged that the left-direction discrimination means 10 is broken (step 353). Then, a low-level signal is output from the port P4, the failure detection termination flag f2 is set to 1 (step 354), and the failure detection of the left-direction discrimination means 10 terminates.

Because the failure detection termination flag f1 of the right-direction discrimination means 9 is checked in step 331 and the failure detection termination flag f2 of the left-direction discrimination means 10 is checked in step 343, failure detection is performed only once after the system starts. When it is judged that the right-direction discrimination means 9 or the left-direction discrimination means 10 is broken in step 341 or 353, the output signal levels of the ports P1, P2, P3, and P4 are made low to stop the motor 1 in step 405 in the main program shown in FIG. 29 until the system stops.

According to the above structure, no dangerous state occurs even if the motor driving direction discrimination means 11 is broken and the motor 1 abnormally operates during failure detection because the failure detection of the motor driving direction discrimination means 11 is performed while the vehicle is stopped. Moreover, because failure detection is performed only once after starting, the original control of the power steering is not influenced due to the failure detection after the failure detection is performed. Moreover, it is possible to use this embodiment together with the embodiments of FIGS. 8, 13, 18 and 22.

Embodiment 11:

In the case of the above embodiment 10, failure detection of the motor driving direction discrimination means 11 is performed when the vehicle speed is 0. However, it is also possible to perform the failure detection only when a clutch for connecting the motor 1 with a load (steering shaft) connected to the motor 1 is turned off so that the load is not influenced.

Figure 27:
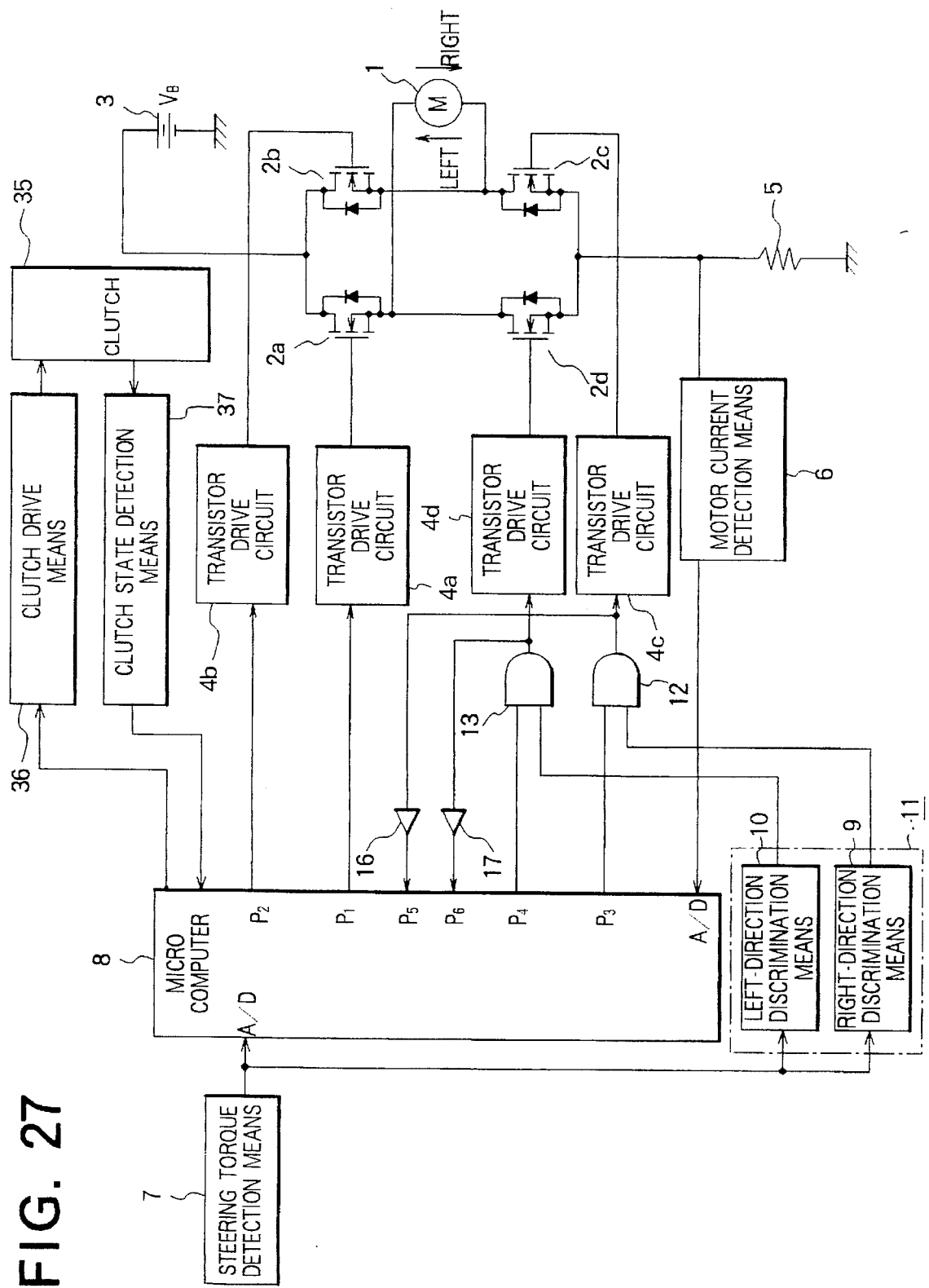
FIG. 27 is a block diagram of the electric power steering controller of the eleventh embodiment of the present invention.
Figure 28:
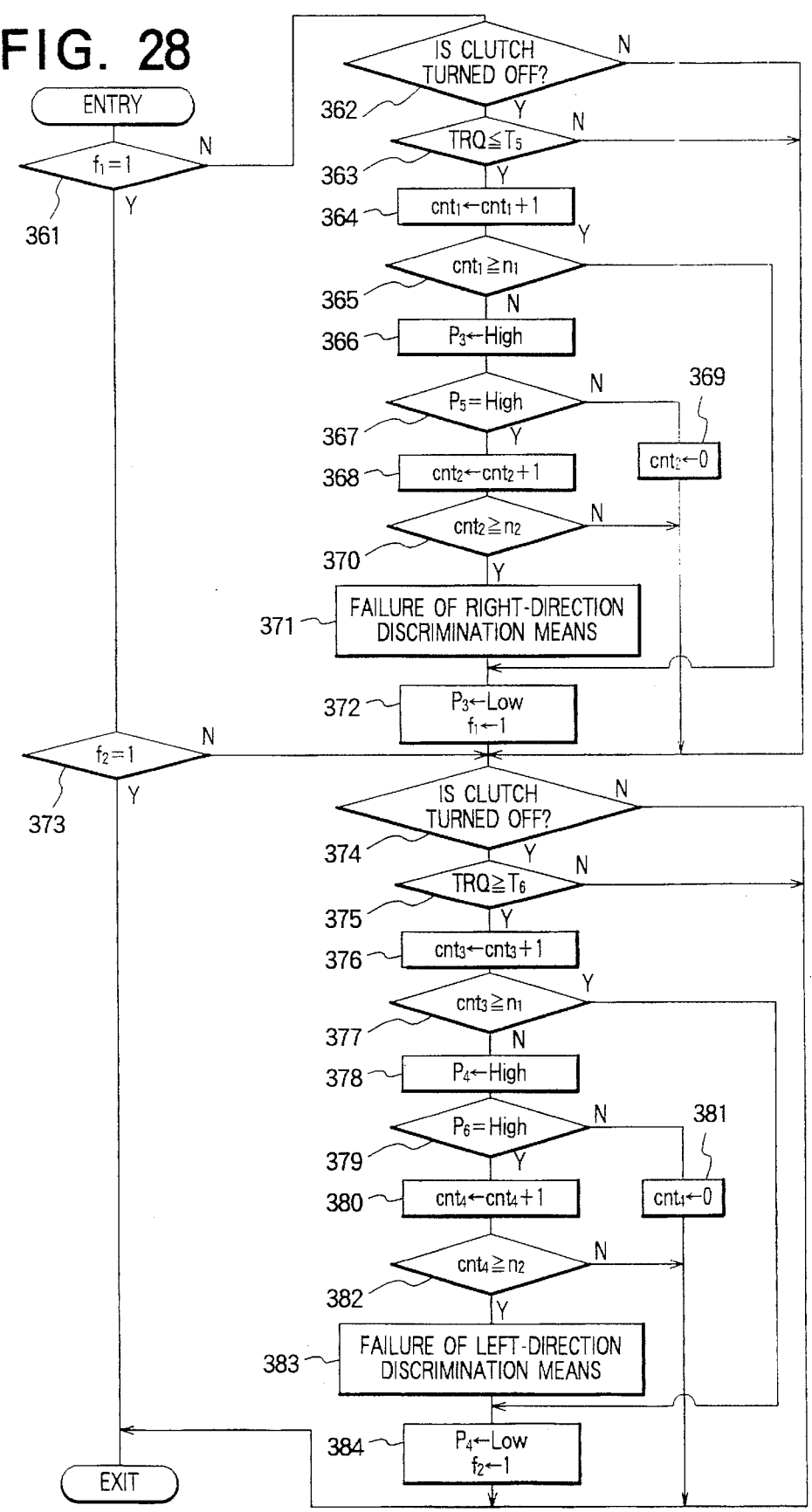
FIG. 28 is a flow chart for explaining the operations of this embodiment.

FIG. 27 is a block diagram of an electric power steering controller preferably used to execute this embodiment. In FIG. 27, symbols similar to those in FIG. 2 represents portions similar or equivalent to those in FIG. 2. A clutch 35 such as an electromagnetic clutch is driven by a clutch driving means 36 which operates in accordance with a control signal sent from the microcomputer 8. The driving state of the clutch 35 is detected by a clutch state detection means 37.

Next, operations of this embodiment will be described below by referring to the flow charts in FIGS. 28 and 29, and FIGS. 2, 3, and 4. When the initialization in the flow chart in FIG. 29 (step 401) terminates, the following failure detection of the motor driving discrimination means 11 (step 402) is started. First, when the failure detection termination flag f1 of the right-direction discrimination means 9 is set to 0 (step 361), it is confirmed by the clutch state detection mean 37 that the clutch 35 is turned off (step 362). When the value of the output signal TRQ of the steering torque detection means 7 is equal to or lower than the fifth threshold $T_5$ (step 363), the counter $cnt_1$ is counted up (step 364) and a high-level signal is output from the port P3 (step 366) unless the counted value of the counter $cnt_1$ reaches the set value $n_1$ (step 365). Then, an output of the first AND circuit 12 is monitored, and the counter $cnt_2$ is counted up when the output signal level of the AND circuit 12 is high but the counter $cnt_2$ is set to 0 when the level is low (steps 367, 368, and 369).

When the counter $cnt_1$ reaches the set value $n_1$ before the counted value of the counter $cnt_2$ reaches the set value $n_2$ (step 365), it is judged that the right-direction discrimination means 9 is normal, a low-level signal is output from the port P3, the failure detection termination flag f1 is set to 1 (step 372), and the failure detection of the right-direction discrimination means 10 terminates. However, when the counted value of the counter $cnt_2$ reaches the set value $n_2$ (step 370) before the counted value of the counter $cnt_1$ reaches the set value $n_1$ (step 365), it is judged that the right-direction discrimination means 9 is broken (step 371), a low-level signal is output from the port P3, the failure detection termination flag f1 is set to 1 (step 372), and the failure detection of the right-direction discrimination means 9 terminates.

In the case of the failure detection of the left-direction discrimination means 10, the counter $cnt_3$ is counted up (step 376) when the clutch 35 is turned off (step 374) and the value of the output signal TRQ of the steering torque detection means 7 is equal to or higher than the sixth threshold $T_6$ (step 375). In this case, unless the counted value of the counter $cnt_3$ reaches the set value $n_1$ (step 377), a high-level signal is output from the port P4 (step 378). The output of the second AND circuit 13 at this time is monitored, and the counter $cnt_4$ is counted up when the output signal level is high but the counter $cnt_4$ is set to 0 when the level is low (steps 379, 380, and 381).

When the counted value of the counter $cnt_3$ reaches the set value $n_1$ before the counted value of the counter $cnt_4$ reaches the set value $n_2$ (step 377), it is judged that the left-direction discrimination means 10 is normal, a low-level signal is output from the port P4, the failure detection termination flag f2 is set to 1 (step 384), and the failure detection of the left-direction discrimination means 10 terminates. However, when the counted value of the counter $cnt_4$ reaches the set value $n_2$ (step 382) before the counted value of the counter $cnt_3$ reaches the set value $n_1$ (step 377), it is judged that the left-direction discrimination means 10 is broken (step 383), a low-level signal is output from the port P4, the failure detection termination flag f2 is set to 1 (step 384), and the failure detection of the left-direction discrimination means 10 terminates.

Figure 29:
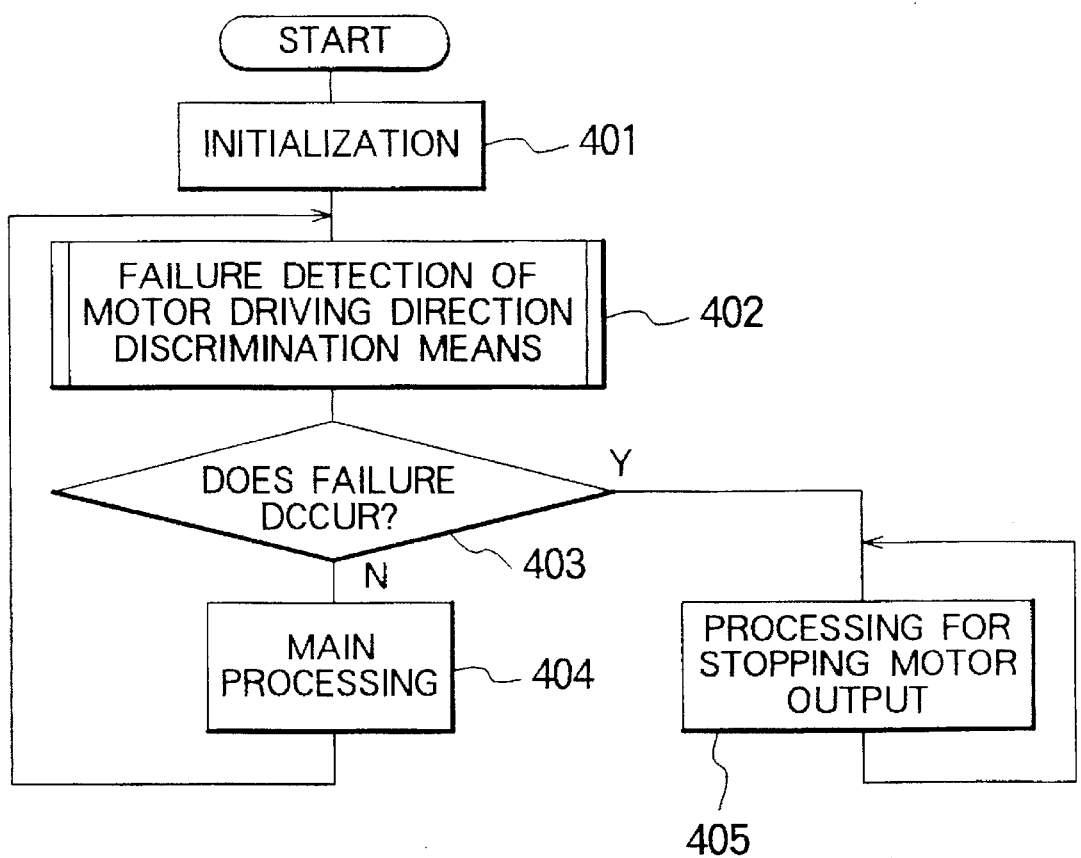
FIG. 29 is a flow chart of the main program for failure detection of all the embodiments.

Because the failure detection termination flag f1 of the right-direction discrimination means 9 is checked in step 361 and the failure detection termination flag f2 of the left-direction discrimination means 10 is checked in step 373, failure detection is performed only once after starting the system. When it is detected in step 371 or 383 that the right-direction discrimination means 9 or the left-direction discrimination means 10 is broken, motor-output stop processing (step 405) shown in FIG. 29 is started, the output signal level of the ports P1, P2, P3, and P4 are made low in step 405 in the main program to stop the motor until the system stops, and moreover the clutch 35 is turned off. Unless any failure is detected, the microcomputer 8 starts main processing other than failure detection (step 404).

According to the above structure, no dangerous state will occur even if the motor driving direction discrimination means 11 goes out of order and the motor 1 abnormally operates because the failure detection of the motor driving direction discrimination means 11 is performed while the clutch is turned off. Moreover, because the failure detection is performed only once after starting the system, the original control of the power steering is not influenced by the failure detection after a failure is detected. Furthermore, it is possible to use the present embodiment together with the embodiments of FIGS. 8, 13, 18, and 22.

As for the above embodiments, the internal structure of the steering torque detection means 7 is not described.

However, it is needless to say that the steering torque detection means 7 includes an interface circuit for amplifying a signal or a phase compensation circuit for compensating a phase such as a differentiation circuit according to necessity.

What is claimed is:

1. An electric power steering controller comprising:

a motor for supplying a steering force to a steering system;

steering torque detection means for detecting a right-direction torque and a left-direction torque supplied to a steering wheel from a vehicle operator;

motor control means for performing right-direction or left-direction drive control of said motor in accordance with an output of said steering torque detection means;

driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;

right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

right-direction discriminating-signal detection means for detecting a right-direction discriminating signal;

left-direction discriminating-signal detection means for detecting a left-direction discriminating signal;

first failure-discrimination means for judging that the right-direction discrimination means has failed when the output of said steering torque detection means shows a right-direction torque smaller than a fifth predetermined threshold smaller than the third threshold by a value equivalent to a detection error and the output of said right-direction discriminating signal continues for a predetermined time;

second failure-discrimination means for judging that the left-direction discrimination means has failed when the output of said steering torque detection means shows a left-direction torque smaller than a sixth predetermined threshold smaller than the fourth threshold by a value equivalent to a detection error and the output of said right-direction discriminating signal continues for a predetermined time; and means for disabling said motor, responsive to said first failure-discrimination means and said second failure-discrimination means.

2. An electric power steering controller comprising:

a motor for supplying a steering force to a steering system;

steering torque detection means for detecting a right-direction torque and a left-direction torque supplied to a steering wheel from a vehicle operator;

motor control means for performing right-direction or left-direction driving control of said motor in accordance with an output of said steering torque detection means;

driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;

right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

a first AND circuit for outputting a right-driving enabling signal to said motor control means only when said right-direction discriminating signal coincides with the right-direction driving signal;

a second AND circuit for outputting a left-driving enabling signal to said motor control means only when the left-direction discriminating signal coincides with the left-direction driving signal;

right-driving enabling signal detection means for detecting a right-driving enabling signal;

left-driving enabling signal detection means for detecting a left-driving enabling signal;

first failure-discrimination means for outputting a right-driving signal when the output of said steering torque detection means shows a right-direction torque smaller than a fifth predetermined threshold smaller than the third threshold by a value equivalent to a detection error and for judging that said right-direction discrimination means or said first AND circuit has failed when the output of the right-driving enabling signal from said first AND circuit is continuous for a predetermined time;

second failure-discrimination means for outputting a left-driving signal when the output of said steering torque detection means shows a left-direction torque smaller than a sixth predetermined threshold smaller than the fourth threshold by a value equivalent to a detection error and for judging that said left-direction discrimination means or said second AND circuit has failed when the output of the left-driving enabling signal from the said second AND circuit is continuous for a predetermined time; and means for disabling said motor, responsive to said first failure-discrimination means and said second failure-discrimination means.

3. The electric power steering controller according to claim 2 further including vehicle speed detection means for detecting a vehicle speed and stop state judgment means for judging that a vehicle is stopped when an output of said vehicle speed detection means is a set value or less, wherein said first and second failure discrimination means performs said judging responsive to said stop state judgment means judging that said vehicle is stopped.

4. The electric power steering controller according to claim 2 further including power cutoff means for cutting off power by disconnecting said motor from said steering system and cutoff state judgment means for judging that said motor is disconnected from said steering system, wherein said first and second failure discrimination means performs said judging responsive to said cutoff state judgment means judging that said motor is disconnected from said steering system.

5. The electric power steering controller according to claim 2 wherein failure detection of the right-direction and left-direction discrimination means is performed once by the failure discrimination means after starting the vehicle.

6. An electric power steering controller comprising:
   a motor for supplying a steering force to a steering system;
   steering torque detection means for detecting a right-direction torque and a left-direction torque supplied to a steering wheel from a vehicle operator;
   motor control means for performing right-direction or left-direction driving control of said motor in accordance with an output of said steering torque detection means;
   driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;
   right-direction discrimination means for outputting a right-direction discriminating signal for said motor when the output of said steering torque detection means shows a right-direction torque smaller than said first threshold but larger than a third predetermined threshold smaller than said first threshold;
   left-direction discrimination means for outputting a left-direction discriminating signal for said motor when the output of said steering torque detection means shows a left-direction torque smaller than said second threshold but larger than a fourth predetermined threshold smaller than said second threshold;
   a first AND circuit for outputting a right-driving enabling signal to said motor control means only when said right-direction discriminating signal coincides with the right-direction driving signal;
   a second AND circuit for outputting a left-driving enabling signal to said motor control means only when the left-direction discriminating signal coincides with the left-direction driving signal;
   neutral point discrimination means for discriminating the vicinity of the neutral point of said steering torque when the output of said steering torque detection means shows a right-direction torque smaller than a fifth predetermined threshold smaller than the third threshold by a value equivalent to a detection error and when the output of said steering torque detection means shows a left-direction torque smaller than a sixth predetermined threshold smaller than said fourth threshold by a value equivalent to a detection error;

motor speed detection means for detecting the rotational speed of a motor;
   voltage applying means for generating a set voltage at a motor terminal of said motor when said motor is not driven;
   motor terminal voltage detection means for detecting a terminal voltage of said motor;
   failure discrimination means for judging that one of said AND circuits outputting said driving enabling signal, or one of said direction discriminating means outputting a direction discriminating signal to this AND circuit has failed when the output of motor speed detection means is a set value or less, when the vicinity of the neutral point of said steering torque is discriminated by neutral point discrimination means, when a right or left-direction driving signal is output to said first or second AND circuit from said driving signal output means, and when the state in which said terminal voltage shows a value other than said set voltage continues for a predetermined time; and
   means for disabling said motor, responsive to said failure discrimination means.

7. The electric power steering controller according to claim 6 further including vehicle speed detection means for detecting a vehicle speed, and stop state judgment means for judging that a vehicle is stopped when an output of said vehicle speed detection means is a set value or less, wherein said failure discrimination means performs said judging responsive to said stop state judgment means judging that said vehicle is stopped.

8. The electric power steering controller according to claim 6 further including power cutoff means for cutting off power by disconnecting said motor from said steering system and cutoff state judgment means for judging that said motor is disconnected from said steering system, wherein said failure discrimination means performs said judging responsive to said cutoff state judgment means judging that said motor is disconnected from said steering system.

9. The electric power steering controller according to claim 6 wherein failure detection of the right-direction and left-direction discrimination means is performed once by the failure discrimination means after starting the vehicle.

10. An electric power steering controller comprising:
    a motor for supplying a steering force to a steering system;
    steering torque detection means for detecting a right-direction torque and a left-direction torque supplied to a steering wheel from a vehicle operator;
    motor control means for performing right-direction or left-direction driving control of said motor in accordance with an output of said steering torque detection means;
    driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;
    right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

a first AND circuit for outputting a right-driving enabling signal to said motor control means only when said right-direction discriminating signal coincides with the right-direction driving signal;

a second AND circuit for outputting a left-driving enabling signal to said motor control means only when the left-direction discriminating signal coincides with the left-direction driving signal;

neutral point discrimination means for discriminating the vicinity of the neutral point of said steering torque when the output of said steering torque detection means shows a right-direction torque smaller than a fifth predetermined threshold smaller than the third threshold by a value equivalent to a detection error and when the output of said steering torque detection means shows a left-direction torque smaller than a sixth predetermined threshold smaller than said fourth threshold by a value equivalent to a detection error;

motor speed detection means for detecting the rotational speed of a motor;

motor current detection means for detecting a current flowing through said motor;

failure discrimination means for judging that one of said AND circuits outputting said driving enabling signal, or one of said direction discriminating means outputting a direction discriminating signal to this AND circuit has failed when the output of motor speed detection means is a set value or less, when the vicinity of the neutral point of said steering torque is discriminated by said neutral point discrimination means, when a driving signal for alternately driving said motor rightward and leftward is output from said driving signal output means with motor control means to said first or second AND circuit, and when a state in which the output of said motor current detection means exceeds a set value continues for a predetermined time; and means for disabling said motor, responsive to said failure discrimination means.

11. The electric power steering controller according to claim 10 further including vehicle speed detection means for detecting a vehicle speed and stop state judgment means for judging that a vehicle is stopped when an output of said vehicle speed detection means is a set value or less, wherein said failure discrimination means performs said judging responsive to said stop state judgment means judging that said vehicle is stopped.

12. The electric power steering controller according to claim 10 further including power cutoff means for cutting off power by disconnecting said motor from said steering system and cutoff state judgment means for judging that said motor is disconnected from said steering system, wherein said failure discrimination means performs said judging responsive to said cutoff state judgment means judging that said motor is disconnected from said steering system.

13. The electric power steering controller according to claim 10 wherein failure detection of the right-direction and left-direction discrimination means is performed once by the failure discrimination means after starting the vehicle.

14. An electric power steering controller comprising:

a motor for supplying a steering force to a steering system;

steering torque detection means for detecting a right-direction torque and a left-direction torque supplied to a steering wheel from a vehicle operator;

motor control means for performing right-direction or left-direction driving control of said motor in accordance with an output of said steering torque detection means;

driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;

right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

a first AND circuit for outputting a right-driving enabling signal to said motor control means only when said right-direction discriminating signal coincides with the right-direction driving signal;

a second AND circuit for outputting a left-driving enabling signal to said motor control means only when the left-direction discriminating signal coincides with the left-direction driving signal;

neutral point discrimination means for discriminating the vicinity of the neutral point of said steering torque when the output of said steering torque detection means shows a right-direction torque smaller than a fifth predetermined threshold smaller than the third threshold by a value equivalent to a detection error and when the output of said steering torque detection means shows a left-direction torque smaller than a sixth predetermined threshold smaller than said fourth threshold by a value equivalent to a detection error;

voltage applying means for generating a set voltage at a terminal of said motor when said motor is not driven;

motor terminal voltage detection means for detecting a terminal voltage of said motor;

motor rotational-direction detection means for detecting a rotational direction of said motor; and failure discrimination means for judging that one of said AND circuits outputting said driving enabling signal, or one of said direction discriminating means outputting a direction discriminating signal to this AND circuit has failed when the vicinity of the neutral point of said steering torque is discriminated by said neutral point discrimination means, when a right or left-direction driving signal is output to said first or second AND circuit by said driving signal output means in accordance with a detected output of said motor rotational-direction detection means, and when the state where a value other than said set voltage at said terminal of said motor continues for a predetermined time until said motor stops; and means for disabling said motor, responsive to said failure discrimination means.

15. The electric power steering controller according to claim 14 further including vehicle speed detection means for detecting a vehicle speed, and stop state judgment means for judging that a vehicle is stopped when an output of said vehicle speed detection means is a set value or less, wherein said failure discrimination means performs said judging responsive to said stop state judgment means judging that said vehicle is stopped.

16. The electric power steering controller according to claim 14 further including power cutoff means for cutting off power by disconnecting said motor from said steering system and cutoff state judgment means for judging that said motor is disconnected from said steering system, wherein said failure discrimination means performs said judging responsive to said cutoff state judgment means judging that said motor is disconnected from said steering system.

17. The electric power steering controller according to claim 14 wherein failure detection of the right-direction and left-direction discrimination means is performed once by the failure discrimination means after starting the vehicle.

18. An electric power steering controller comprising:

a motor for supplying a steering force to a steering system;

a power supply for supplying electric power to said motor;

steering torque detection means for detecting a right-direction torque and a left-direction torque supplied to a steering wheel from a vehicle operator;

motor control means including a first switching element connected between a first terminal of said motor and said power supply, a second switching element connected between a second terminal of said motor and said power supply, a third switching element connected between the second terminal of said motor and a ground, and a fourth switching element connected between the first terminal of said motor and a ground;

driving signal output means for outputting a right-direction driving signal to said first switching element when the output of said steering torque detection means shows a right-direction torque larger than a first predetermined threshold set to the right of a neutral point and a left-direction driving signal to said second switching means when the output of said steering torque detection means shows a left-direction torque larger than a second predetermined threshold set to the left of the neutral point;

right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

a first AND circuit for outputting a right-driving enabling signal to said third switching element only when said right-direction discriminating signal coincides with the right-direction driving signal;

a second AND circuit for outputting a left-driving enabling signal to said fourth switching element means only when the left-direction discriminating signal coincides with the left-direction driving signal;

a motor current detection means for detecting an abnormal current flowing through said motor;

failure discrimination means for outputting a left-direction driving signal to said second AND circuit when the output of said steering torque detection means shows a value larger than the first threshold, for judging that said left-direction discrimination means or said second AND circuit has failed when the state of abnormal motor current detected by said motor current detection means continues for a set time, for outputting a right-direction driving signal to said first AND circuit when the output of said steering torque detection means shows a value larger than the second threshold, and for judging that said right-direction discrimination means or said first AND circuit has failed when said detected abnormal motor current state continues for a set time; and means for disabling said motor, responsive to said failure discrimination means.

19. The electric power steering controller according to claim 6, further comprising first feed-through current prevention means for preventing said first switching element and said fourth switching element from being turned on simultaneously; and second feed-through current prevention means for preventing said second switching element and said third switching element from being turned on simultaneously; whereby a feed-through current is prevented from escaping when a failure is detected.

20. The electric power steering controller according to claim 18 further including vehicle speed detection means for detecting a vehicle speed and stop state judgment means for judging that a vehicle is stopped when an output of said vehicle speed detection means is a set value or less, wherein said failure discrimination means performs said judging responsive to said stop state judgment means judging that said vehicle is stopped.

21. The electric power steering controller according to claim 18 further including power cutoff means for cutting off power by disconnecting said motor from said steering system and cutoff state judgment means for judging that said motor is disconnected from said steering system, wherein said failure discrimination means performs said judging responsive to said cutoff state judgment means judging that said motor is disconnected from said steering system.

22. The electric power steering controller according to claim 18 wherein failure detection of the right-direction and left-direction discrimination means is performed once by the failure discrimination means after starting the vehicle.

23. An electric power steering controller comprising:

a motor for supplying a steering force to a steering system;

steering torque detection means for detecting a right-direction torque and a left-direction torque supplied to a steering wheel from a vehicle operator;

motor control means for performing right-direction or left-direction driving control of said motor in accordance with an output of said steering torque detection means;

driving signal output means for outputting a right-direction driving signal to said motor control means when the output of said steering torque detection means shows a right-direction torque larger than a first predetermined threshold set to the right of a neutral point and a left-direction driving signal to said motor control means when the output of said steering torque detection means shows a left-direction torque larger than a second predetermined threshold set to the left of the neutral point;

right-direction discrimination means for outputting a right-direction discriminating signal for said motor when the output of said steering torque detection means shows a right-direction torque smaller than said first threshold but larger than a third predetermined threshold smaller than said first threshold;

left-direction discrimination means for outputting a left-direction discriminating signal for said motor when the output of said steering torque detection means shows a left-direction torque smaller than said second threshold but larger than a fourth predetermined threshold smaller than said second threshold;

signal cutoff means for forcibly cutting off a direction discriminating signal output from said right-direction discrimination means or left-direction discrimination means;

a first AND circuit for outputting a right-driving enabling signal to said motor control means only when the right-direction driving signal discriminating signal and the right-direction driving signal output from said right-direction discrimination means coincide with each other;

a second AND circuit for outputting a left-driving enabling signal to said motor control means only when the left-direction discriminating signal and the left-direction driving signal output from said left-direction discrimination means coincide with each other;

voltage applying means for generating a set voltage at a terminal of said motor when said motor is not driven;

motor terminal voltage detection means for detecting a terminal voltage of said motor;

failure discrimination means for judging that one of said AND circuits outputting said driving enabling signal or one of said direction discrimination means outputting a direction discriminating signal to this AND circuit has failed when said direction discriminating signal is cut off, when a right- or left-direction driving signal is output to said first or second AND circuit from said driving signal output means, and when said motor terminal detection means detects a terminal voltage other than said set voltage for a set time; and means for disabling said motor, responsive to said failure discrimination means.

24. The electric power steering controller according to claim 23 further including vehicle speed detection means for detecting a vehicle speed, and stop state judgment means for judging that a vehicle is stopped when an output of said vehicle speed detection means is a set value or less, wherein said failure discrimination means performs said judging responsive to said stop state judgment means judging that said vehicle is stopped.

25. The electric power steering controller according to claim 23 further including power cutoff means for cutting off power by disconnecting said motor from said steering system and cutoff state judgment means for judging that said motor is disconnected from said steering system, wherein said failure discrimination means performs said judging responsive to said cutoff state judgment means judging that said motor is disconnected from said steering system.

26. The electric power steering controller according to claim 23 wherein failure detection of the right-direction and left-direction discrimination means is performed once by the failure discrimination means after starting the vehicle.

* * * * *